United States Patent
Joo et al.

(10) Patent No.: US 11,713,249 B2
(45) Date of Patent: Aug. 1, 2023

(54) CONTINUOUS MANUFACTURE OF GRAPHENIC COMPOUNDS

(71) Applicants: Cornell University, Ithaca, NY (US); Axium IP, LLC, Los Angeles, CA (US)

(72) Inventors: Yong Lak Joo, Ithaca, NY (US); Mohammed Alamer, Ithaca, NY (US); Brian Williams, Ithaca, NY (US)

(73) Assignees: CORNELL UNIVERSITY, Ithaca, NY (US); AXIUM IP, LLC, Los Angeles, CA (US)

( * ) Notice: Subject to any disclaimer, the term of this patent is extended or adjusted under 35 U.S.C. 154(b) by 436 days.

(21) Appl. No.: 16/755,394

(22) PCT Filed: Oct. 10, 2018

(86) PCT No.: PCT/US2018/055132
§ 371 (c)(1),
(2) Date: Apr. 10, 2020

(87) PCT Pub. No.: WO2019/075000
PCT Pub. Date: Apr. 18, 2019

(65) Prior Publication Data
US 2021/0206645 A1 Jul. 8, 2021

Related U.S. Application Data

(60) Provisional application No. 62/671,982, filed on May 15, 2018, provisional application No. 62/570,822, filed on Oct. 11, 2017.

(51) Int. Cl.
| | | |
|---|---|---|
| *C01B 32/19* | (2017.01) | |
| *C01B 32/198* | (2017.01) | |
| *B01J 8/10* | (2006.01) | |
| *B01J 19/18* | (2006.01) | |

(52) U.S. Cl.
CPC .............. *C01B 32/198* (2017.08); *B01J 8/10* (2013.01); *B01J 19/1843* (2013.01); *B01J 2219/0009* (2013.01); *B01J 2219/00094* (2013.01); *B01J 2219/1945* (2013.01); *C01B 2204/04* (2013.01); *C01P 2002/08* (2013.01); *C01P 2002/72* (2013.01); *C01P 2002/82* (2013.01)

(58) Field of Classification Search
None
See application file for complete search history.

(56) References Cited

FOREIGN PATENT DOCUMENTS

| | | | |
|---|---|---|---|
| CN | 106882803 | * | 6/2017 |
| KR | 20140083854 | * | 7/2014 |
| KR | 2015/0096899 A | | 8/2015 |
| KR | 2015/0109505 A | | 10/2015 |
| KR | 20150109505 | * | 10/2015 |
| KR | 101727939 B1 | | 4/2017 |

OTHER PUBLICATIONS

English Machine translation of Son (KR 2016/0128927). (Year: 2016).*
English Machine translation of Chang (KR 2016/048378). (Year: 2016).*
Ilin, Konstantin, et al. "On the Stability of the Couette-Raylor flow . . . ". European Journal of Mechanics. 80, 174-186 (2020). (Year: 2020).*
Kang, B.K., et al.. Synthesis and characterization of a mesoporous and three dimensional N-doped graphene structure via the Couette-Taylor flow and hydrothermal method, Journal of the European Ceramic Society, Mar. 9, 2017, vol. 37, pp. 3673-3680.
Tran, T.S., et al., High shear-induced exfoliation of graphite into high quality graphene by Taylor-Couette flow, RSC Advances, 2016, vol. 6, No. 15, pp. 12003-12008.
Lee, S., and Park, S., Enhanced dispersion and material properties of multi-walled carbon nanotube composites through turbulent Taylor-Couette flow, Composites Part A: Applied Science and Manufacturing, Jan. 8, 2017, vol. 95, pp. 118-124.

* cited by examiner

*Primary Examiner* — Sheng H Davis
(74) *Attorney, Agent, or Firm* — Paul J. Roman, Jr.; Johnson, Marcou, Isaacs & Nix, LLC

(57) ABSTRACT

Provided herein are high throughput continuous or semi-continuous reactors and processes for manufacturing graphenic materials, such as graphene oxide. Such processes are suitable for manufacturing graphenic materials at rates that are up to hundreds of times faster than conventional techniques, have little batch-to-batch variation, have a high degree of tunability, and have excellent performance characteristics.

12 Claims, 14 Drawing Sheets

GO without NaNO₃

GO without H₃PO₄

CONTINUOUS MANUFACTURE OF GRAPHENIC COMPOUNDS

CROSS-REFERENCE

This application claims the benefit of U.S. Provisional Application Nos. 62/570,822 filed 11 Oct. 2017 and 62/671,982 filed 15 May 2018, both of which are incorporated herein by reference in their entireties.

BACKGROUND OF THE INVENTION

Batch processes are typically utilized in the manufacture of for manufacturing graphenic compounds, including graphene oxide. Hummers' method utilizing $KMnO_4$, $NaNO_3$, and $H_2SO_4$ in a batch process is one of the more common method used for preparing graphene oxide. Another common batch process for manufacturing graphene oxide is the Tour method, which excludes the use of $NaNO_3$, and increases the amount of $KMnO_4$. According to Tour ("Improved Synthesis of Graphene Oxide," ACS Nano, 2010, 4(8), 4806-14), the Tour process provides a greater amount of hydrophilic oxidized graphene material as compared to Hummers' method or Hummers' method with additional $KMnO_4$. According to Tour, the GO produced by the Tour method is more oxidized than that prepared by Hummers' method.

SUMMARY OF THE INVENTION

The use of graphenic compounds manufactured in batch processes, have limited potential in commercial applications, particularly high tech application that require very consistent materials and materials characteristics. Batch-to-batch variability of the graphenic compounds produced by such methods leads to inconsistency in graphenic products and makes quality control of products produced using such components difficult or impossible.

In addition, batch processes take a long time to complete and are difficult to scale because small batch reactions don't necessarily scale to large batch reactions. For example, product inconsistencies can arise for a number of reasons, such as a greater number of local effects during the reaction (e.g., lesser or greater exposer to any one or more reagent). Moreover, scaling to large batch reactions leads to the production of large batches of graphenic suspensions that often are not stable (e.g., with phase separation occurring). In some instances, graphenic suspensions may be processed to form dried or isolated graphenic materials, but such drying and/or isolation techniques can change the material properties and characteristics of the graphenic compounds relative to the suspended products.

Moreover, such batch processes typically use strongly oxidative conditions which, over time, causes the large sheets of the graphite to be significantly reduced in size, typically producing submicron graphenic sheets. Other methods of manufacturing graphenic compounds, such as chemical vapor deposition are extremely expensive and slow, but can be used to produce graphenic sheets that are larger than those typically produced by the Hummer and Tour methods, as well as variants thereof. However, such CVD methods are generally only able or used to produce sheets up to a few microns in size.

Provided in certain embodiments herein are processes and systems for manufacturing graphenic components, such as graphene oxide, including single layer graphene oxide and/or multi-layered graphene oxide. In specific instances, the processes provided herein are continuous or semi-continuous (flow) processes. In certain instances, processes provided herein facilitate greatly improved (reduced) manufacturing times for graphenic products. Moreover, in some instances, processes provided herein facilitate greater control of the interaction between reagents of the processes thereof, providing greater control of and greater quality control of resulting graphenic products. For example, in certain embodiments, provided herein are processes that are utilized to control the degree of oxidation, the type of oxidation, the number of layers, the lateral dimension, other characteristics, or combinations thereof of graphenic products produced thereby. In addition, with the ability to precisely control flow, rotation/vortex parameters, and inputs characteristics, timing and location, greater quality control of the resultant products is achieved, whether the graphenic product is first out, last out, somewhere in-between, or even during a different run or using a separate system.

In specific embodiments, provided herein is a process for manufacturing a graphenic compound (e.g., graphene oxide), the process comprising:
    a. injecting a first stock into a first inlet of a continuous or semi-continuous reactor, the first stock comprising graphite;
    b. collecting the graphenic compound (e.g., graphene oxide) from an outlet of the continuous reactor, the graphenic compound being collected downstream from the injection points of the first stock.

In certain embodiments, the continuous or semi-continuous reactor comprises a reaction chamber into which the stock(s) are injected, the reactor chamber being configured between an outer wall of a first body and an inner wall of a second body. In specific embodiments, the outer wall of the first body defines a cylindrical body and the inner wall of the second body defines a cylindrical bore. In some embodiments, the first body (or outer wall thereof) is configured to rotate (e.g., relative to the second body outer wall). In certain embodiments, the wall(s) of the cylindrical body and/or bore rotate(s) around an axis of the respective cylinder body and/or bore. The cylindrical body and/or bore form any suitable shape, such as a circular cylinder, an elliptical cylinder, a right cylinder, an oblique cylinder, or the like. In certain embodiments, the cylindrical bore and/or body is optionally substituted with conical frustum bore and/or body, respectively. In certain embodiments, the ratio of the (e.g., average) diameter of the cylinder bore formed by the inner wall of the outer body to the diameter of the cylinder body formed by the outer wall of the inner body is about 100:50 to about 100:99.9, such as about 100:80 to about 100:99 or about 100:85 to about 100:95.

In specific instances, a continuous reactor is a reactor that continues to produce product (e.g., which is ejected from the reactor via the output thereof) so long as starting material and reactants continue to be provided to the reactor (e.g., the input(s) thereof). In other specific instances, a semi-continuous or semi-batch reactor is a reactor that has an input and an output, with a flow there-between, but—after an initial stock of starting material is provided to the input—the output feeds back into the input until the reaction is completed or terminated.

In certain embodiments, a reactor provided herein has a (e.g., fluid) flow (e.g., within the chamber thereof) from an input to an output. In other words, one or more fluid stock (e.g., solutions, suspensions, or combinations thereof) is input into the reactor via one or more inlet, such one or more fluid stocks mixing and flowing toward and out of one or more outlet, at least one outlet being down-flow ("downstream") from the one or more inlet. In various embodiments, any suitable flow is provided within the reactor (e.g., chamber thereof), such as a toroidal flow (e.g., around a cylinder, such as in the reactor's lateral dimension), a vortex flow (e.g., a Taylor vortex flow), a laminar flow (e.g., Couette flow), a (e.g., azimuthal) shear, non-vortex and/or non-turbulent flow (such as, e.g., a Couette flow), a turbulent flow, and/or the like. In some embodiments, the fluid has a toroidal flow. In certain embodiments, the fluid has a vortex flow, such as a toroidal vortex flow (e.g., wavy vortex or Taylor vortex flow). In some embodiments, a reactor provided herein is configured to provide a vortex flow, e.g., toroidal vortex flow, within a reactor chamber thereof. In certain embodiments, the flow is a modified Taylor-Couette flow (Taylor-Couette with axial flow) and/or the reactor is a continuous Taylor-Couette reactor. In specific embodiments, the flow dynamics are configured by adjustment of flow rate, drum size, bore size, gap between the inner wall and the outer wall, rotation speed, or any combination thereof. For example, in some instances, the vortices (vortexes) are generated if the Taylor Number, Ta (e.g., calculated according to any suitable metric, depending on the configuration, such as wherein Ta is equal to $\Omega^2 R_1 (R_2-R_1)^3/v^2$, wherein $\Omega$ is the angular velocity, v is the kinematic viscosity, $R_1$ is the external radius of an inner cylinder, and $R_2$ is an internal radius of an external cylinder (bore)) exceeds a critical value, $Ta_c$ (calculated according to any suitable metric, such as depending on configuration, such as ≥1700). In some instances, variations of such calculations are contemplated for variances herein, such as in continuous systems, rotation of outer cylinders vs inner cylinders, etc.

In some instances, given the continuous or semi-continuous nature of a reactor provided herein, such flows are modified to account for the flow of the fluid axially along the length of the reactor (e.g., forming a helical flow). In specific embodiments, the flow is a helical, toroidal flow (e.g., flowing around a cylindrical body from an inlet at a first longitudinal position (e.g., along the body, bore and/or reactor) toward an outlet at a second longitudinal position (e.g., along the body, bore and/or reactor)). In certain embodiments, the helical, toroidal flow comprises helical, toroidal vortexes therein. In other embodiments, the helical, toroidal flow comprises a shear and/or laminar flow (e.g., comprising no vortexes).

In some embodiments, provided herein is a process or system for manufacturing a graphenic compound (e.g., graphene oxide), the process comprising:
  a. injecting a first (graphitic) stock into a first inlet of a (e.g., continuous or semi-continuous) reactor, the first stock comprising graphite (e.g., and an intercalating agent, an oxidizing agent, and/or a strong acid, such as sulfuric acid, phosphoric acid, perchloric acid, sodium nitrate, nitric acid, or any combination of one or more thereof); and
  b. collecting the graphenic compound (e.g., graphene oxide) from an outlet of the continuous reactor, the graphene oxide being collected downstream from the injection points of the first (and second) stock(s).

In specific embodiments, provided herein is a process or system for manufacturing a graphenic compound (e.g., graphene oxide), the process comprising:
  a. injecting a first (graphitic) stock into a first inlet of a (e.g., continuous or semi-continuous) reactor, the first stock comprising graphite (e.g., and an intercalating agent, an oxidizing agent, and/or a strong acid, such as sulfuric acid, phosphoric acid, perchloric acid, sodium nitrate, nitric acid, or any combination of one or more thereof);
  b. injecting a second (quenching) stock into a second inlet of the continuous reactor, the second stock comprising an oxidizing and/or quenching agent (e.g., a peroxide, such as hydrogen peroxide) and being injected downstream from the injection point of the first stock(s); and
  c. collecting the graphenic compound (e.g., graphene oxide) from an outlet of the continuous reactor, the graphenic compound (e.g., graphene oxide) being collected downstream from the injection points of the first (and second) stock(s).

In certain embodiments, the process further comprises injecting a third (aqueous) stock into a third inlet of the continuous reactor, the third stock comprising water and being injected downstream from the injection point of the first and second stocks. In some embodiments, injection of the aqueous stock facilitates exfoliation of graphite oxide and/or multi-layered graphene oxide produced in a process herein to single or few layer graphene oxide. In certain instances, the second and third stocks are combined. In some embodiments, the aqueous or water stock is injected (e.g., the stock is pre-heated and/or heated within the reactor) at an elevated temperature (the stock and/or reactor has an elevated temperature). In certain instances, the temperature is at least 50 C, e.g., at least 60 C, at least 70 C, or the like.

In some embodiments, the process comprises injecting an intercalating agent, oxidizing agent and/or strong acid into the reactor (e.g., chamber thereof). In some instances, an intercalating agent or strong acid is included with and/or injected with the first stock. In certain embodiments, the process further comprises injecting an additional (e.g., fourth) stock into a (e.g., fourth) inlet of the reactor. In some instances, such a stock is injected upstream from the second inlet (e.g., upstream from, even with, or downstream from the first inlet). In some instances, any suitable intercalating agent, oxidizing agent, or strong acid is utilized. In certain embodiments, intercalating agent, oxidizing agent, or strong acids include, by way of non-limiting example, sulfuric acid, phosphoric acid, potassium permanganate, sodium nitrate or a combination thereof. In certain instances, one or more intercalating agent, oxidizing agent, and/or strong acid is optionally included in the first stock and one or more intercalating agent, oxidizing and/or strong acid is optionally included in the additional (e.g., fourth) stock.

Also, provided in certain embodiments herein are processes for manufacturing a graphenic component (e.g., graphene oxide), the process comprising injecting a first stock into a toroidal flow or subjecting a first stock to a toroidal flow, the first stock comprising graphite (e.g., and collecting the graphenic component). In specific embodiments, the toroidal flow is a toroidal vortex flow (e.g., Taylor vortex flow). In some embodiments, the process further comprises injecting a second (quenching) stock into the toroidal flow, the second stock comprising a quenching and/or oxidizing agent (e.g., a peroxide, such as hydrogen peroxide). In certain embodiments, the process further comprises injecting a third (e.g., aqueous) stock into the toroidal flow, the third stock comprising water and being injected downstream from the injection point of the second stock. In some embodiments, a process herein further comprises injecting a fourth stock comprising an intercalating agent, oxidizing agent and/or a strong acid into the toroidal flow, or subjecting a fourth stock to a toroidal flow (e.g., into which the first stock is injected). In some instances, the first stock comprises an intercalating agent, oxidizing agent and/or a strong acid (e.g., when a fourth stock is or is not utilized). Other descriptions and optional parameters of such stocks are as described for any process herein.

Also, provided in certain embodiments herein are processes for manufacturing a graphenic component (e.g., graphene oxide), the process comprising injecting a first stock into continuous reactor, the continuous reactor comprising a series of continuously stirred domains, and the first stock comprising graphite (e.g., and collecting the graphenic component). In specific embodiments, the series of continuously stirred domains form a toroidal vortex flow (e.g., Taylor vortex flow). In some embodiments, the process further comprises injecting a second (quenching) stock into a second inlet of the reactor, the second stock comprising a quenching or oxidizing agent (e.g., a peroxide, such as hydrogen peroxide) (e.g., downstream from the first inlet). In certain embodiments, the process comprises injecting a third (e.g., aqueous) stock into a third inlet of the reactor, the third stock comprising water and being injected downstream from the injection point of the second stock. In some embodiments, a process herein further comprises injecting a fourth stock comprising an intercalating agent, oxidizing agent and/or a strong acid into a fourth inlet of the reactor (e.g., upstream from the second inlet, the outlet, or both). In some instances, the first stock comprises an intercalating agent, oxidizing agent and/or a strong acid (e.g., when a fourth stock is or is not utilized). Other descriptions and optional parameters of such stocks are as described for any process herein.

As used herein, a first, second, third, and/or fourth stock, domain, or the like utilized in a process, composition, or system herein does not suggest that any other stock, domain or the like must be utilized or present in the process, composition or system, unless otherwise noted. For example, description of the use of a fourth stock herein does necessitate the use of a third stock. Numerical descriptors are merely utilized to differentiate which stocks are being discussed and described herein.

Also provided herein are various compositions, systems, and graphenic products described herein. In one embodiment, provided herein is a composition, the fluid comprising a plurality of fluid vortices. In specific embodiments, the composition comprises a (e.g., first) domain comprising graphite and an intercalating agent or a strong acid, such as described herein. In more specific embodiments, the composition further comprises a (e.g., second) domain comprising intercalated graphite (an intercalation graphite compound (GIC)) (e.g., stage-1 graphite intercalation compound (GIC)) (e.g., and an oxidizing agent). In some embodiments, the composition comprises a (e.g., third) domain comprising graphite oxide (e.g., pristine graphite oxide (PGO)) (e.g., and water). In certain embodiments, the composition comprises a (e.g., fourth) domain comprising graphene oxide (e.g., multi-layered and/or single layer graphene oxide). In specific embodiments, the composition comprises a multi-layered graphene oxide domain and a single layer graphene oxide domain.

Provided in certain embodiments herein are any reactors or reactor systems suitable for performing the processes described herein.

In some embodiments, provided herein is a continuous or semi-continuous reactor or reactor system comprising:
 a. an inner (e.g., cylindrical) body, the inner body comprising an outer wall;
 b. an outer body, the outer body comprising an inner wall, the inner wall defining a (e.g., cylindrical) bore, the inner body being configured within the bore (e.g., at least partially within the bore—for example, in some instances, the inner body can be longer than the bore);
 c. a reaction chamber, the reaction chamber being configured between the outer wall of the inner body and the inner wall of the outer body;
 d. a first inlet, the first inlet being configured in fluid communication with the reaction chamber; and
 e. a first outlet, the first outlet being configured in fluid communication with the reaction chamber (e.g., and configured at a different axial position from the first inlet).

In some embodiments, the reactor or reactor system further comprises one or more motor configured to rotate one or more body of reactor (e.g., inner and/or outer body thereof).

In certain embodiments, the reactor system further comprises one or more pump, such as a pump configured to inject a fluid (e.g., a graphite stock fluid, or an acid stock fluid) to one or more inlet of the reactor or reactor system. In specific embodiments, the reactor system comprises a pump configured to pump a graphitic stock into the reaction chamber via the first inlet.

In some embodiments, the reactor or reactor system further comprises a collection vessel, such as configured to collect a product (e.g., a graphenic suspension or solution) ejected from the outlet. In certain embodiments, a reactor system comprises a plurality of reactor systems arranged in series, such as wherein the outlet of one reactor feeds into the inlet of a subsequent reactor in the series. In some instances, a flow reactor provided herein is optionally configured in combination with (e.g., in series with) another type of reactor, such as a stirred tank reactor, or the like.

In various embodiments, the reactor or reactor system components are comprised of any suitable material. By way of non-limiting example, the inner and/or outer body (or surface thereof) independently is or comprises any one or more of the following: a stainless-steel alloy (e.g., 304 stainless steel, 310M stainless steel), an austenitic stainless steel (e.g., Avesta 254 SMO), an austenitic chromium-nickel stainless steel (e.g., 316 stainless steel), a super duplex stainless steel alloy (e.g., ZERON® 100), polytetrafluoroethylene (e.g., TEFLON™), glass (e.g., borosilicate) coated metal, borosilicate glass, polytetrafluoroethylene (e.g., TEFLON™) coated metal, nickel-chromium-molybdenum-tungsten alloy (e.g., Alloy 22), stainless steel with silicon, a Ni—Fe—Cr—Mo alloy (e.g., Alloy 20, Alloy G-30, Alloy 33, Cronder 2803 Mo), a Ni—Cr—Mo alloy (e.g., Alloy C-22, Alloy-C-276, Hastelloy C-2000), an alloy (e.g., LEWMET, Hastelloy D-205, Sandvik HT 9076), lead, high silicon cast iron, cast iron (e.g., Meehanite, grey cast iron), and/or ductile iron (e.g., MONDI).

In certain embodiments, a reactor system provided herein comprises a temperature control body configured in at least partially surrounding relation all or part of the reaction chamber. In some instances, the temperature control body is a cooling jacket (e.g., hollow jacket comprising a coolant), a heating jacket (e.g., electric heating jacket or a hollow jacked comprising a heated fluid), a cooling coil (e.g., hollow coil comprising a coolant), a heating coil (e.g., electric heating coil or a hollow coil comprising a heated fluid), or the like.

In certain instances, graphenic components are provided and described herein. In general, a graphenic component is a two-dimensional, sheet-like or flake-like carbon form that comprises monolayer graphenes, as well as multi-layer graphenes (e.g., graphenes comprising 1 up to about 40 graphenic layers, such as 1 to about 25 or 1 to about 10 graphenic layers), as opposed to three dimensional carbon structures, such as graphite, and one dimensional structures, such as carbon nanotubes (CNTs), and zero dimensional structures, such as C60 buckyball. A pristine graphenic layer is a single-atom-thick sheet of hexagonally arranged, sp2-bonded carbons atoms occurring within a carbon material structures, regardless of whether that material structure has a 3D order (graphitic) or not. As discussed herein, graphenic components optionally comprise pristine and/or defective or functionalized graphenic layers. For example, defective graphene layers may be optionally functionalized, such as described herein. In some instances, graphene layers are functionalized with oxygen and/or other moieties. For example, graphene oxide is an oxygen functionalized graphene or a chemically modified graphene prepared by oxidation and exfoliation that is accompanied by extensive oxidative modification of the basal plane. Herein, graphene oxide is a single or multi-layered material with high oxygen content, such as characterized by C/O atomic ratios of less than 3.0, such as about 2.0. Reduced graphene oxide (rGO) is graphene oxide that has been reductively processed by chemical, thermal, microwave, photo-chemical, photo-thermal, microbial/bacterial, or other method to reduce the oxygen content. Oxygen content of rGO isn't necessarily zero, but is typically lower than the oxygen content of graphene oxide, such as having a C/O atomic ratio of over 3.0, such as at least 5, at least 10, or the like. In certain instances, graphene layers of rGO are less pristine than that of graphene, such as due to imperfect reduction and assembly of the two-dimensional structure.

In certain instances, a value "about" an indicated value is a value suitable for achieving a suitable result and/or a result similar as achieved using the identified value. In some instances, a value "about" an indicated value is between ½ and 2 times the indicated value. In certain instances, a value "about" an indicated value is ±50% the indicated value, ±25% the indicated value, ±20% the indicated value, ±10% the indicated value, ±5% the indicated value, ±3% the indicated value, or the like.

These and other objects, features, and characteristics of the batteries, electrodes, materials, compositions and/or processes disclosed herein, will become more apparent upon consideration of the following description and the appended claims with reference to the accompanying drawings and examples, all of which form a part of this specification. It is to be expressly understood, however, that the drawings and examples are for the purpose of illustration and description only and are not intended as a definition of the limits of the invention. As used in the specification and in the claims, the singular form of "a", "an", and "the" include plural referents unless the context clearly dictates otherwise.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings of which:

DETAILED DESCRIPTION OF THE INVENTION

Provided in certain embodiments herein are processes and systems for manufacturing graphenic components, such as graphene oxide, including single layer graphene oxide and/ or multi-layered graphene oxide. Also provided herein are compositions used to make graphenic products described herein and/or the graphenic products produced or produceable by processes or from compositions described herein. In specific instances, the processes provided herein are continuous or semi-continuous (flow) processes. In certain instances, processes provided herein facilitate greatly improved (reduced) manufacturing times for graphenic products. Moreover, in some instances, processes provided herein facilitate greater control of the interaction between reagents of the processes thereof, providing greater control of and greater quality control of resulting graphenic products. For example, in certain embodiments, provided herein are processes that are utilized to control the degree of oxidation, the type of oxidation, the number of layers, the lateral dimension, other characteristics, or combinations thereof of graphenic products produced thereby. In addition, with the ability to precisely control flow, rotation/vortex parameters, and inputs characteristics, timing and location, greater quality control of the resultant products is achieved, whether the graphenic product is first out, last out, somewhere in-between, or even during a different run or using a separate system.

In specific embodiments, provided herein is a process for manufacturing a graphenic compound (e.g., graphene oxide), the process comprising:
 a. injecting a first stock into a first inlet of a continuous or semi-continuous reactor, the first stock comprising graphite;
 b. collecting the graphenic compound (e.g., graphene oxide) from an outlet of the continuous reactor, the graphenic compound being collected downstream from the injection points of the first stock.

In specific embodiments, the reactor having a fluid flowing therein, the flow having a flow type as described herein (e.g., laminar flow, toroid flow, vortex flow, stable vortex flow (non-wavy vortex flow), vortex flow without laminar flow, Taylor vortex flow (TVF), or the like). In some instances, the fluid within the reactor comprises the first (graphite) stock, such as alone or in combination with one or more other fluid provided to the reactor.

Figure 1:
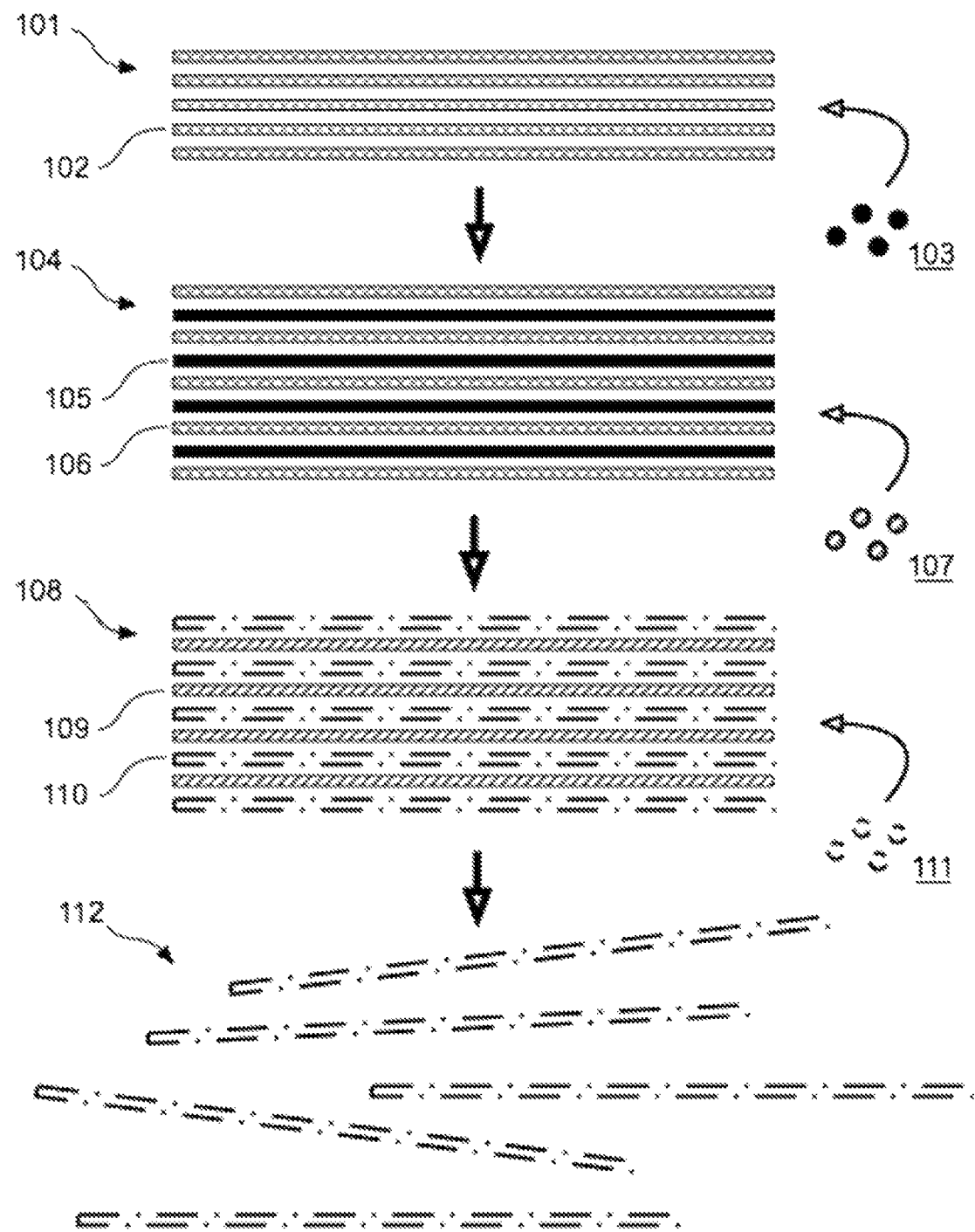
FIG. 1 illustrates an exemplary process whereby a graphenic compound (graphene oxide) is prepared utilizing a reactor or process described herein.

FIG. 1 illustrates an exemplary process whereby a graphenic compound (graphene oxide) is prepared utilizing a reactor or process described herein. As illustrated, graphite 101 is provided, the graphite 101 comprising a plurality of tightly packed graphene sheets 102. In some instances, the graphite 101 is exposed to a strong acid, oxidizing agent and/or intercalating agent 103, such as sulfuric acid, phosphoric acid, sodium nitrate, potassium permanganate, any combination of one or more thereof, or other suitable agent. As intercalation occurs, a graphite intercalation compound (GIC) 104 is provided. In specific instances, as in FIG. 1, a stage-1 graphite intercalation compound (GIC) 104 is provided (e.g., a stage-1 graphite intercalation compound 104 wherein the layered structure comprising graphite layers 106 alternating with intercalation layers 105, whereas a stage-2 graphite intercalation compound has an intercalation layer alternating with every two graphite layers). In various instances, the intercalation layer comprises any suitable material, and depends on the intercalation agent utilized. For example, in specific instances, such as wherein sulfuric acid is utilized, the intercalation layer comprises sulfuric acid, bisulfate, sulfate, and/or any combination thereof.

In some instances, following intercalation of the graphite 101 to form the graphite intercalation compound (GIC) 104, the graphite intercalation compound (GIC) is oxidized by exposure to an oxidizing agent 107. As illustrated in FIG. 1, exposure of the graphite intercalation compound (GIC) 104 to the oxidizing agent 107 produces a graphite oxide (e.g., pristine graphite oxide (PGO)) 108, which comprises graphite oxide layers 110 and may comprise an intercalation layer 109 (which may be the same or different from the intercalation layer 105 of the graphite interaction compound (GIC) 104). In some instances, workup of the graphite oxide 108 is utilized to produce graphene oxide. For example, use of a water-based (aqueous) stock 111 is utilized in some instances to partially or fully exfoliate the graphite oxide 108 to form multilayered graphene oxide or single layer graphene oxide 112.

Figure 2:
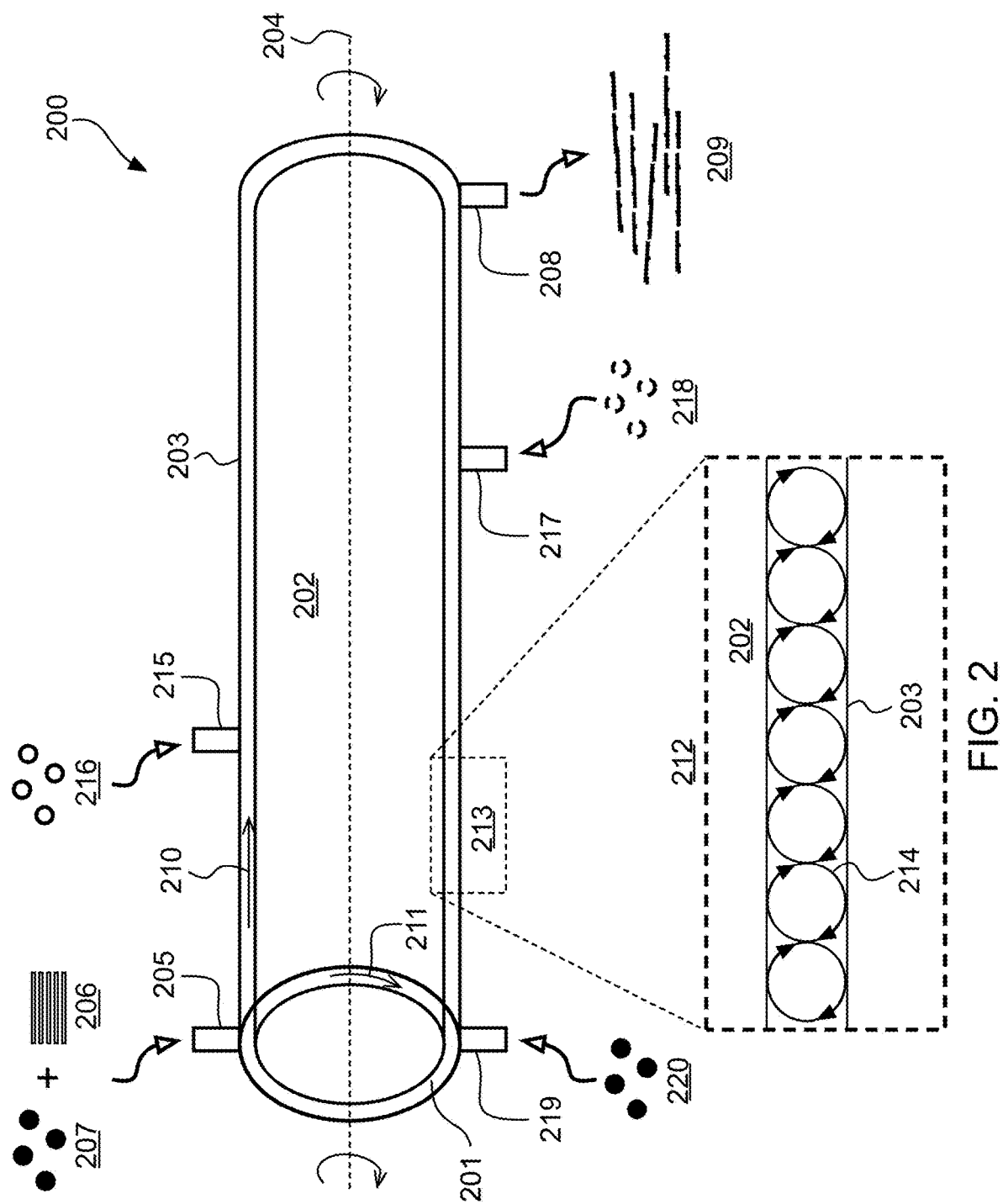
FIG. 2 illustrates a schematic of an exemplary toroidal flow reactor provided herein, with a variety of inlets and an outlet.

FIG. 2 illustrates an exemplary embodiment of a process and a reactor 200 provided herein. As illustrated, the reactor 200 comprises a reaction chamber 201 into which the stock(s) are injected, the reactor chamber 201 being configured between an outer wall of a first body 202 and an inner wall of a second body 203. In specific embodiments, the outer wall of the first body defines a cylindrical body and the inner wall of the second body defines a cylindrical bore. In some instances, the first body 202 and/or second body 203 is configured to rotate about an axis 204 thereof. In certain embodiments, the wall(s) of the cylindrical body and/or bore rotate(s) around an axis of the respective cylinder body and/or bore. The cylindrical body and/or bore form any suitable shape, such as a circular cylinder, an elliptical cylinder, a right cylinder, an oblique cylinder, or the like. In certain embodiments, the cylindrical bore and/or body is optionally substituted with conical frustum bore and/or body, respectively. In various embodiments, the first body and the second body (e.g., inner and outer walls or surfaces thereof, respectively) comprise any suitable material. In some embodiments, the first body and the second body (e.g., inner and outer wall or surfaces thereof, respectively) independently is or comprises a stainless-steel alloy (e.g., 304 stainless steel, 310M stainless steel), an austenitic stainless steel (e.g., Avesta 254 SMO), an austenitic chromium-nickel stainless steel (e.g., 316 stainless steel), a super duplex stainless steel alloy (e.g., ZERON® 100), polytetrafluoroethylene (e.g., TEFLON™), glass (e.g., borosilicate) coated metal, borosilicate glass, polytetrafluoroethylene (e.g., TEFLON™) coated metal, nickel-chromium-molybdenum-tungsten alloy (e.g., Alloy 22), stainless steel with silicon, a Ni—Fe—Cr—Mo alloy (e.g., Alloy 20, Alloy G-30, Alloy 33, Cronder 2803 Mo), a Ni—Cr—Mo alloy (e.g., Alloy C-22, Alloy-C-276, Hastelloy C-2000), an alloy (e.g., LEWMET, Hastelloy D-205, Sandvik HT 9076), lead, high silicon cast iron, cast iron (e.g., Meehanite, grey cast iron), ductile iron (e.g., MONDI), any combination thereof, or the like.

Figure 3:
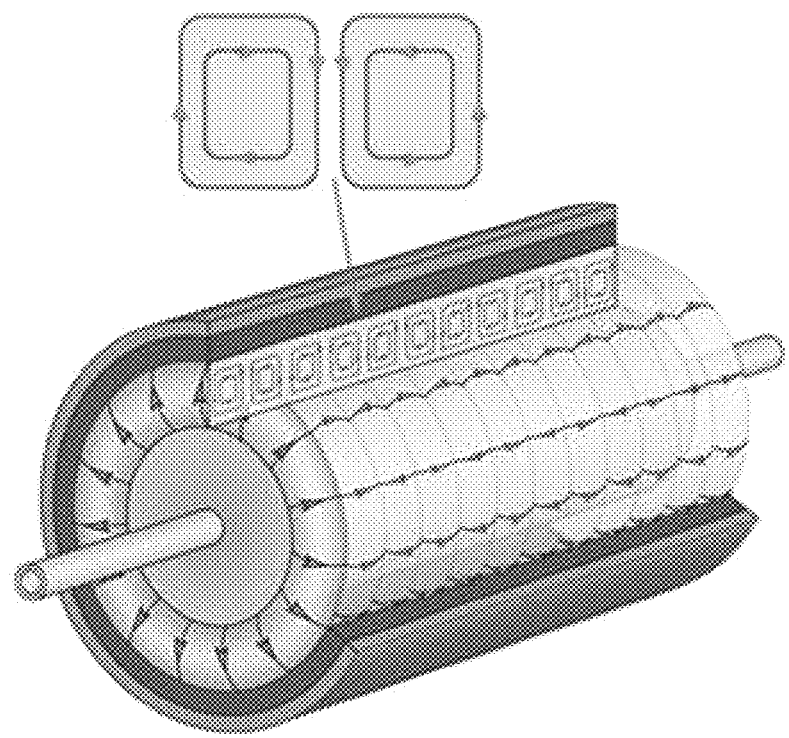
FIG. 3 illustrates a schematic of an exemplary toroidal reactor provided herein, with a plurality of toroidal (Taylor) vortices.

As illustrated, the reactor has at least one inlet 205 configured to receive a stock, particularly a graphite stock (e.g., a stock comprising a graphite 206, such as in a suspension). In some instances, the graphite stock further comprises an intercalating agent or a strong acid 207. The reactor further comprises at least one outlet 208, from which product is extracted from the reactor. In the case of a continuous flow reactor, the extracted product comprises the graphenic component (e.g., single or multi-layered graphene oxide) 209. In the case of a semi-continuous or semi-batch reactor, the extracted product is injected back into the reactor one or more times until a graphenic component is ultimately collected from the reactor. In some instances, however, it is to be understood that a reaction herein is optionally stopped short of production of a graphenic component, and any intermediate product described herein is optionally collected from the outlet. In general, the reactor facilitates the flow 210 of the stock(s) and/or reagents from one or more inlet 205 of the reactor to one or more outlet 208 of the reactor 200. Moreover, with one or more of the inner cylinder or the inner surface of the bore cylinder rotating relative to the other, the flow has a toroidal aspect 211. Moreover, as illustrated in the expanded view 212 of the cut-out 213, the flow of the fluid within the reactor comprises, in some instances, a plurality of vortices (a vortex flow herein) 214. In some instances, a batch reactor configured such as described herein can be configured to provide a plurality of stirred domains (e.g., the series of domains or vorticies can be considered a series of continuous stirred tank reactors) or vortices such as illustrated in the expanded view of 212, wherein each of the plurality of vortices have a toroidal shape, such as illustrated in FIG. 3. In certain instances, with the flow 210 of a continuous or semi-continuous reactor 200 herein, the toroidal shapes of the vortices 214 are distorted (e.g., forming distorted toroidal vortices), such as forming vortices with a helical shape (e.g., forming helical vortices).

As illustrated in FIG. 2, additional inlets are optionally included in a reactor provided herein. In certain instances, a continuous or semi-continuous reactor provided herein comprises at least one additional inlet for injecting one or more reagent into the reactor. As illustrated in the reactor 200, in certain embodiments, the reactor 200 comprises, in some embodiments, a second inlet 215 facilitating the injection of an a quenching or oxidizing agent, or other desired agent, 216 into the reactor chamber 201. In the case of a semi-continuous reactor, a second inlet is optionally utilized to inject any or all non-graphitic stock into the reactor chamber. As exemplarily illustrated, the second inlet 215 is downstream from the first inlet 205. In some instances, a reactor 200 provided herein comprises a (optional) third inlet 217, such as for injecting water or an aqueous solution 218 into the reactor chamber 201. Additional inlets can also be provided, as desired. For example, the reactor 200 of FIG. 2 illustrates in additional inlet 219 that is near the first inlet 205, the additional inlet 219 being configured for injecting a strong acid, oxidizing agent and/or intercalating agent (including agents that facilitate intercalation of the graphite, such as potassium permanganate) 220 into the reactor chamber 201.

In more specific instances, FIG. 2 illustrates a schematic of a continuous synthesis of graphene oxide (GO) sheets from graphite in a continuous flow reactor (e.g., Taylor-Couette reactor (TCR)) 200. In specific instances, a suspension of graphite flakes 206 in $H_2SO_4$ and/or $H_3PO_4$ 207 is introduced at one inlet 205, while $KMn_2O_4$ 220 solution is added at the other inlet 219 to loosen up graphitic layers, leading to the formation of form stage-1 graphite intercalation compound (GIC). An oxidizing agent 216 such as hydrogen peroxide is added to convert the stage-1 GIC into oxidized graphite, pristine graphite oxide (PGO). The third step is conversion of PGO into conventional GO after exposure to water 218, which involves hydrolysis of covalent sulfates and loss of all interlayer registry. In some instances, this approach does not generate toxic gas and the temperature is easily controlled, which is important, in some instances, for large scale production of GO. Such inputs and processes are optionally modified, such as described herein, e.g., to tune, modify and/or optimize throughput, output materials, or the like.

In certain embodiments, a reactor provided herein has a (e.g., fluid) flow (e.g., within the chamber thereof) from an input to an output. In other words, one or more fluid stock (e.g., solutions, suspensions, or combinations thereof) is input into the reactor via one or more inlet, such one or more fluid stocks mixing and flowing toward and out of one or more outlet, at least one outlet being down-flow ("downstream") from the one or more inlet. In various embodiments, any suitable flow is provided within the reactor (e.g., chamber thereof), such as a toroidal flow, a vortex flow (e.g., a Taylor vortex flow), a laminar flow (e.g., a Couette flow), a turbulent flow, and/or the like. In some embodiments, the fluid has a toroidal flow. In certain embodiments, the fluid has a vortex flow, such as a toroidal vortex flow (e.g., wavy vortex or Taylor vortex flow). In some embodiments, a reactor provided herein is configured to provide a vortex flow, e.g., toroidal vortex flow, within a reactor chamber thereof. In certain embodiments, the flow is a modified Taylor-Couette flow (Taylor-Couette with axial flow) and/or the reactor is a continuous Taylor-Couette reactor. In specific embodiments, the flow dynamics are configured by adjustment of flow rate, drum size, bore size, gap between the inner wall and the outer wall, rotation speed, or any combination thereof. FIG. 2 illustrates a Taylor vortex flow, however, depending on the rotation speed, other flow types can be observed in the reactor.

Figure 19:
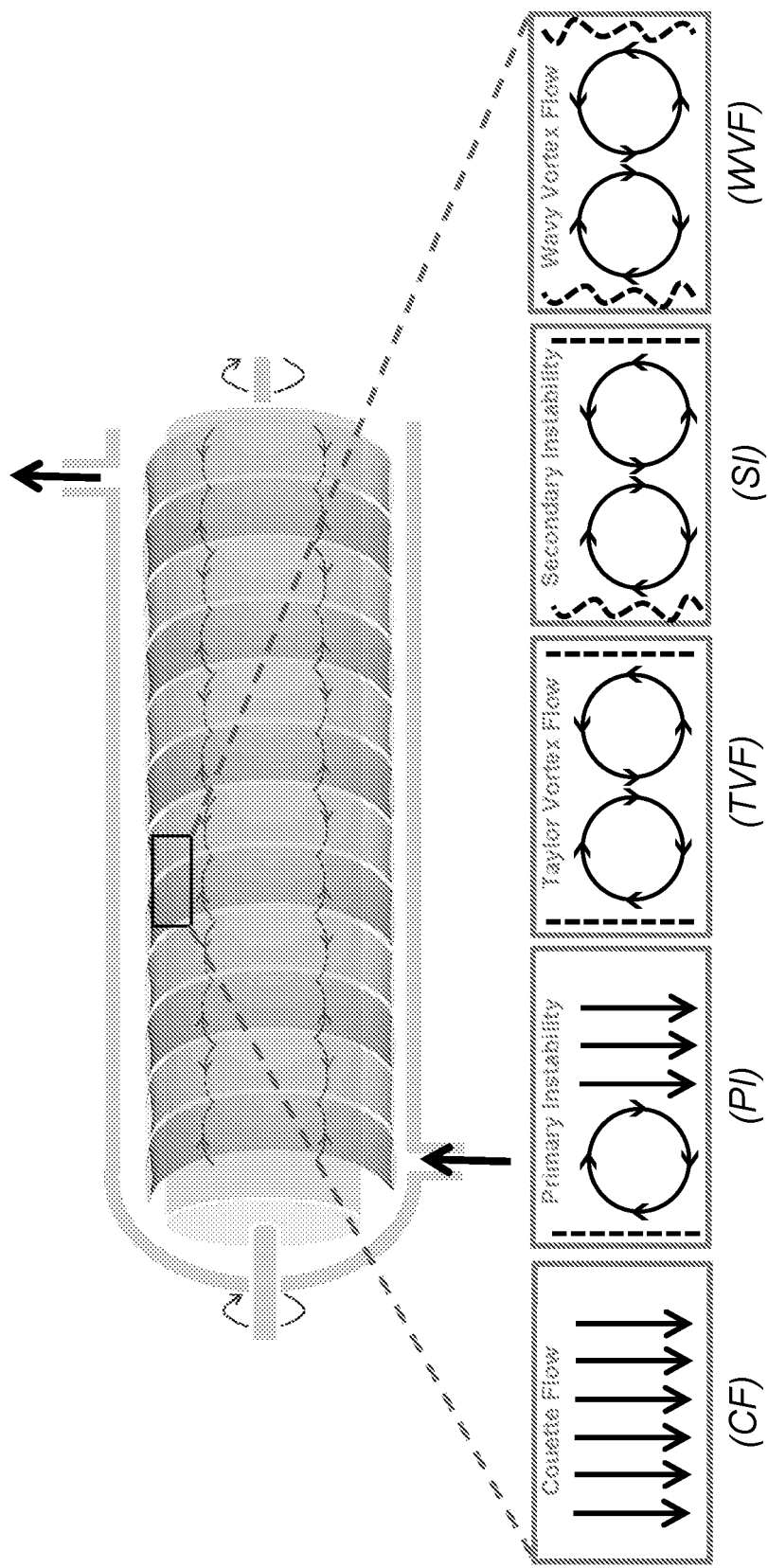
FIG. 19 illustrates various exemplary flow types of a process or reactor provided herein

FIG. 19 illustrates the Couette (laminar) flow observed at slow (inner) rotational speeds (e.g., wherein $Ta<Ta_c$). Further, as illustrated in FIG. 19, when Ta exceeds Tac, vortexes form, but when Ta is close to Tac, instabilities (vortexes) form near the reactor inlet, but as the flow continues toward the reactor exit, laminar flow resumes. This type of flow is illustrated as primary instabilities (PI). As Ta increases, instabilities form throughout the reactor, forming a Taylor vortex flow (TVF). Increasing the $Ta/Ta_c$ further, however, creates a secondary instability (SI), where a wavy flow is observed near the inlet of the reactor. Further increase of $Ta/Ta_c$ leads to a full wavy vortex flow (VWF). In some embodiments, the flow is a stable laminar (e.g., Couette) flow and/or a flow having a $Ta/Ta_c$ of less than 1, such as less than 0.9, such as less than 0.8 (e.g., 0.5 to 0.9 or 0.6 to 0.8). In certain embodiments, the flow is a stable vortex (e.g., Taylor) flow and/or a flow having a $Ta/Ta_n$ of about 1.05 to about 1.4, such as about 1.05 to about 1.3, such as about 1.1 to about 1.2.

Figure 20:
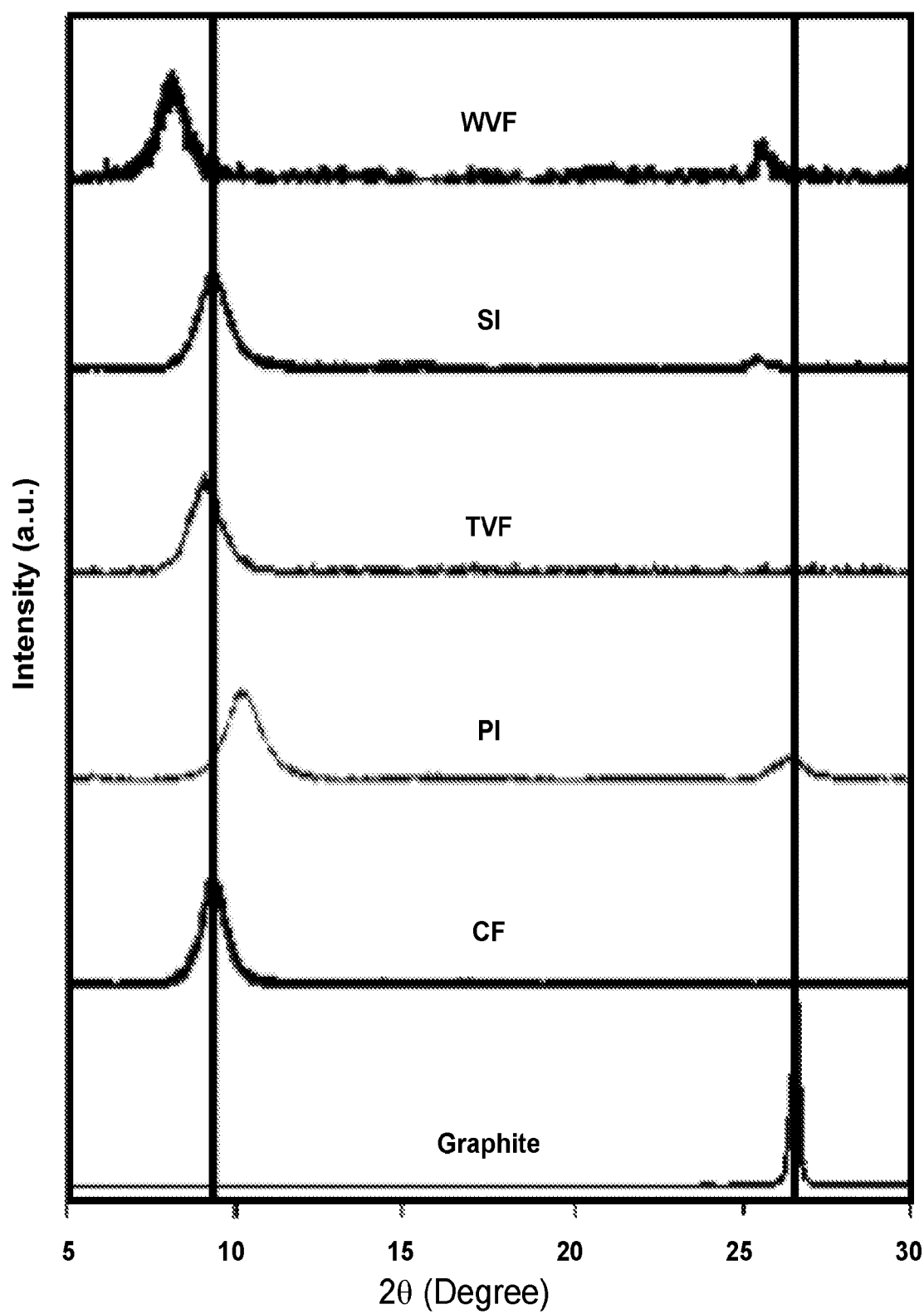
FIG. 20 illustrates XRD images of the resulting material prepared according to a process provided herein using various flow types.

FIG. 20 illustrates the results of injecting graphite into a reactor herein, with the various flow types illustrated in FIG. 19. As illustrated in FIG. 20, after just one minute, in a reactor having a (stable) laminar or Couette (shearing) flow is observed to have excellent conversion of graphite to graphenic compound (graphene oxide). By contrast the primary instability flow is observed to have good conversion to the graphenic compound, but some graphite remains. The stable vortex flow (Taylor vortex flow) is observed to provide excellent conversion of graphite to the graphenic compound, with no graphite component observed. By contrast, both flows having wavy morphologies and that use the most amount of energy produced good conversion of graphite to graphenic compound (graphene oxide), but had significant amounts of graphite also observed.

Figure 12:
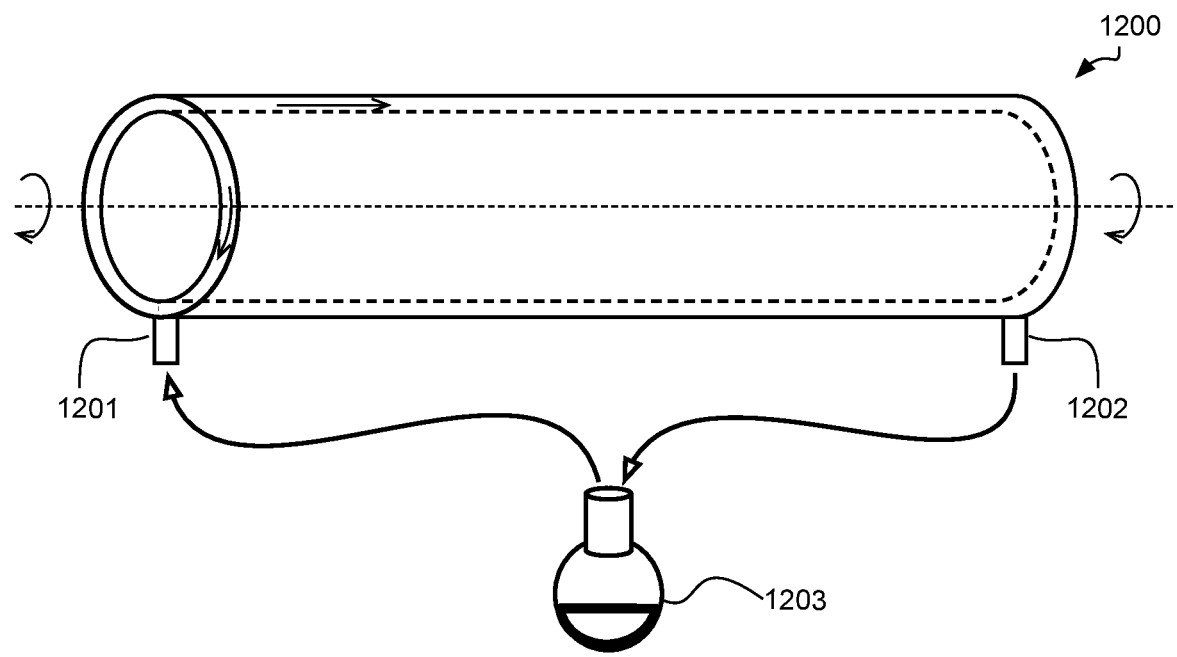
FIG. 12 illustrates a schematic of an exemplary semi-continuous toroidal flow reactor provided herein, with an inlet (additional inlets are optional) and an outlet.
Figure 14:
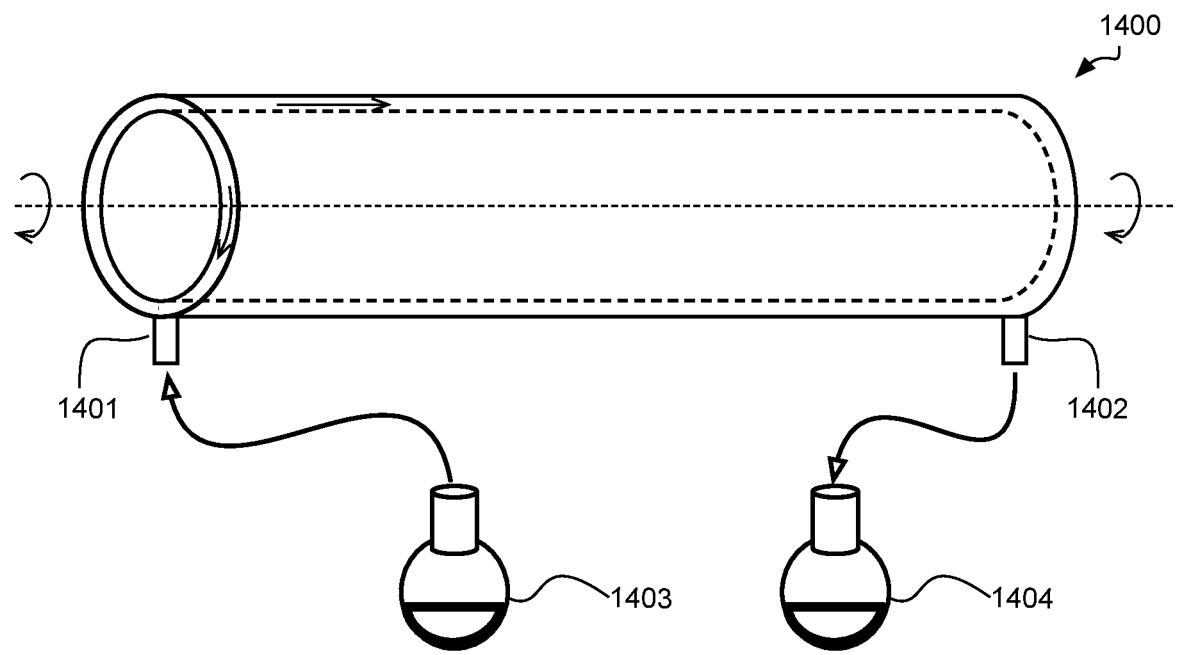
FIG. 14 illustrates a schematic of an exemplary continuous toroidal flow reactor provided herein, with an inlet (additional inlets are optional) and an outlet.

In various embodiments, a process provided herein utilizes or a system herein comprises any suitable reactor, such as a toroidal reactor. In some embodiments, the toroidal reactor is a toroidal flow reactor, a toroidal batch reactor, or the like. In various embodiments, the toroidal flow reactor is a toroidal continuous flow reactor, or a toroidal semi-continuous (semi-batch) reactor. FIG. 12 illustrates an exemplary toroidal semi-continuous (semi-batch) reactor provided herein. As illustrated, the reactor 1200 has at least one inlet 1201 and at least one outlet. In some instances, the reactor is charged via an opening or via the inlet 1201, such as with graphite and other reaction agents, such as described herein. After being subjected to the reactor, a reaction mixture is expelled from the outlet 1202 and recycled back into the inlet 1202. The outlet 1202 optionally feeds directly back into the inlet 1201, or proceeds through a collection container 1203. After a desired time or number of passes through the reactor 1200, the (e.g., final) graphenic product is expelled via an outlet 1202 and collected, such as in a collection receptacle 1203. The reactants are optionally subjected to the reactor any suitable number of times (passes through the reactor), such as one or more times, two or more times, 5 or more times, 10 or more times, or the like. FIG. 14 illustrates an exemplary toroidal continuous flow reactor, wherein a stock 1403 is provided to an inlet 1401 of a reactor provided herein, and the reaction product 1404 is collected via an outlet 1402 of the reactor 1400 after a single pass through the reactor.

Figure 18:
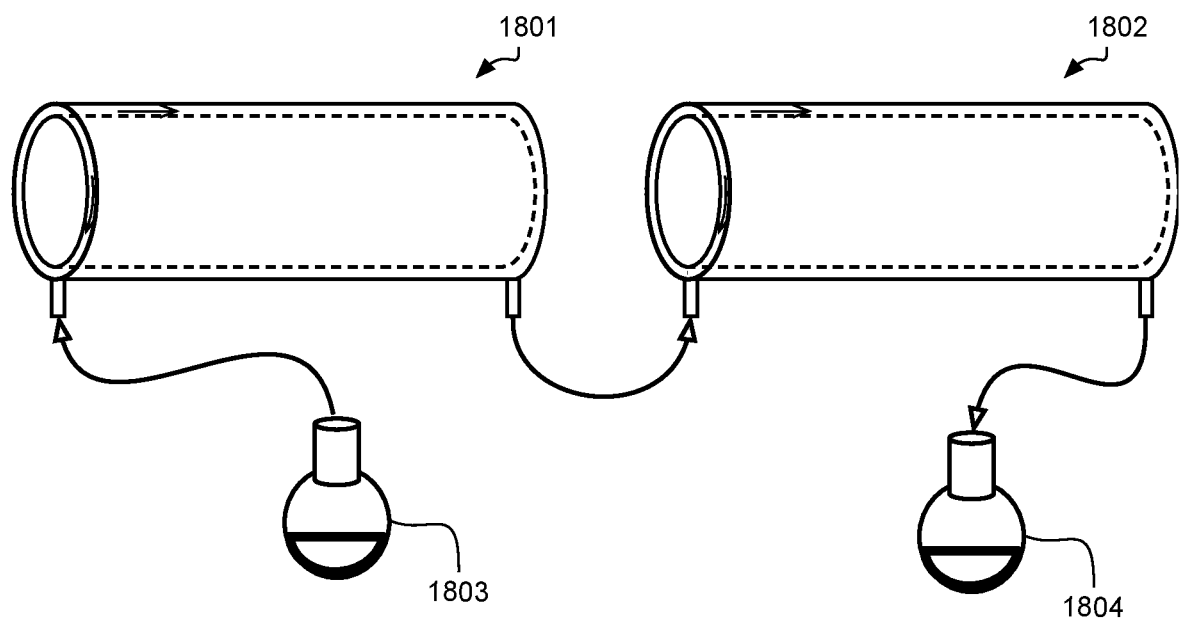
FIG. 18 illustrates an exemplary system provided herein comprising a plurality of exemplary reactors provided herein.

In some embodiments, a system herein comprises (or a process provided herein comprises using) a series of reactors, such as illustrated in FIG. 18. FIG. 18 illustrates an exemplary system comprising a plurality of reactors (e.g., a first reactor 1801 and a second reactor 1802) provided herein, such as wherein a stock is provided to an inlet of a first reactor 1801, a first product is provided via an outlet of the first reactor 1801, the first product is provided to an inlet of a second reactor 1802 and a second product is provided via an outlet of a second reactor 1802. FIG. 18 illustrates an exemplary continuous flow reactor, but semi-batch or semi-continuous reactors of such configurations are also provided herein. In various embodiments, the first and second products are any suitable product, such as illustrated in the schematic of FIG. 1, such as wherein the first product is a graphite oxide 108, and the second product is a graphene oxide 112.

In certain embodiments, the reactor comprises one or more temperature controlled domains. In certain embodiments, a jacket or coil is positioned in at least partial surrounding relation to the outer wall of the reactor. In some instances, the temperature control domain is a cooling domain (e.g., wherein the jacket or coil comprises a coolant). In certain embodiments, a system provided herein has a first temperature controlled domain comprising a cooling domain and a second temperature controlled domain comprising a heating domain. In some instances, a first and a second reactor are provided in a system herein, such as illustrated in FIG. 18, wherein the first reactor is cooled and the second reactor is heated.

Figure 4:
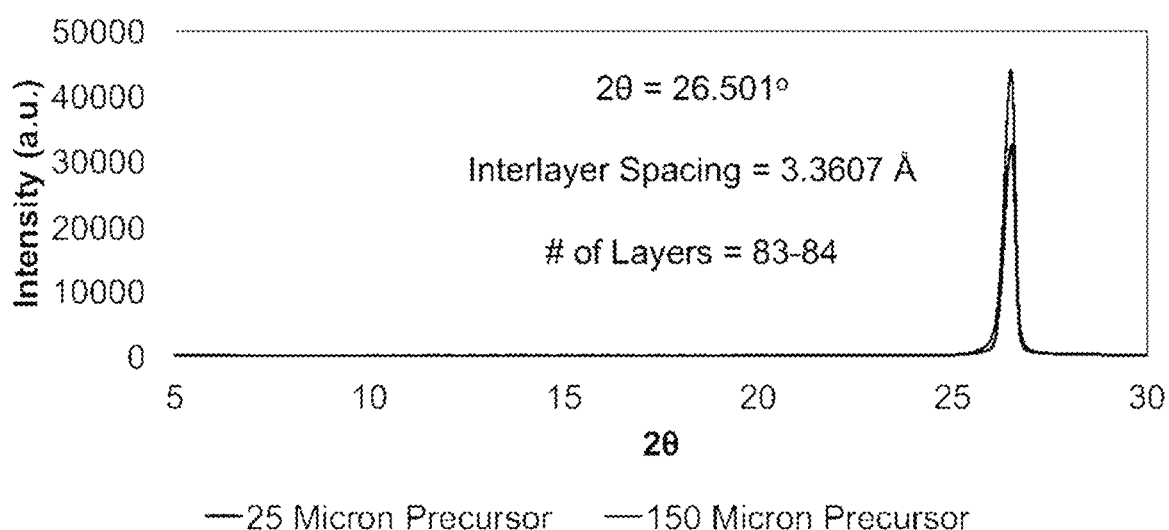
FIG. 4 illustrates XRD traces of exemplary graphite materials utilized in processes and compositions herein.

In certain embodiments, graphite utilized herein is any suitable graphite, such as natural graphite, natural graphite flake, synthetic graphite, any combination thereof, or the like. In certain embodiments, the graphite is a multi-layered structure comprising any suitable number of layers and/or having any suitable (e.g., particle) dimension or size. In certain instances, a graphite provided herein comprises at least 25 layers (e.g., graphitic carbon layers stacked on top of one another), at least 50 layers, at least 75 layers, or the like. FIG. 4 illustrates XRD patterns of exemplary graphite materials utilized in processes and compositions herein. Various graphitic particle sizes are optionally utilized, such as having an average size of at least 1 micron, at least 5 micron, at least 10 micron, at least 25 micron, at least 100 micron, or the like. In specific instances, the average particle size is less than 1 mm, less than 500 micron, less than 250 micron, less than 100 micron, or the like. Any suitable concentration of graphite is utilized in a stock and/or reactor herein. In specific embodiments, the concentration of graphite in a stock described herein is about 0.1 wt. % to about 50 wt. %, e.g., 0.5 wt. % to 50 wt. %.

In some embodiments, any suitable strong acid, oxidizing agent and/or intercalating agent provided is utilized herein. In some embodiments, the strong acid, oxidizing agent and/or intercalating agent functions to swell and/or intercalate into and/or oxidize the graphite layers. In some embodiments, the strong acid, oxidizing agent and/or intercalating agent comprises one or more of the following: sulfuric acid, bisulfate, sulfate, nitric acid, nitrate, perchloric acid, perchlorate, permanganate, phosphoric acid, phosphate, biphosphate, or the like. In the case of bisulfate, sulfate, nitrate, perchlorate, permanganate, phosphate, biphosphate, or other anion utilized, any suitable cation is optionally utilized, such as sodium, potassium, or the like. It is to be understood that in a stock, however, reference to an ion or salt herein includes reference to the compound in ionic (e.g., solvated or disassociated) or salt form. Concentrations of strong acids or intercalating agents utilized herein are present in any suitable amount.

In certain embodiments, a process herein includes subjecting a reaction mixture to a quenching agent or an additional oxidizing agent. Any suitable quenching or oxidizing agent is utilized in any method or system or composition described herein. In specific embodiments, the quenching or oxidizing agent is a peroxide, such as hydrogen peroxide (e.g., 1-50 wt. %, such as 3 wt. %, 30 wt. %, or the like hydrogen peroxide). In certain embodiments, the oxidization of the graphite (e.g., to form graphite oxide) is achieved using the strong acid and/or intercalating agent, without the need for exposure to an additional oxidizing agent or stock. In some instances, the additional agent is a quenching agent, such as to quench residual oxidizing and/or intercalating agents, strong acids, and/or the like.

Figure 5:
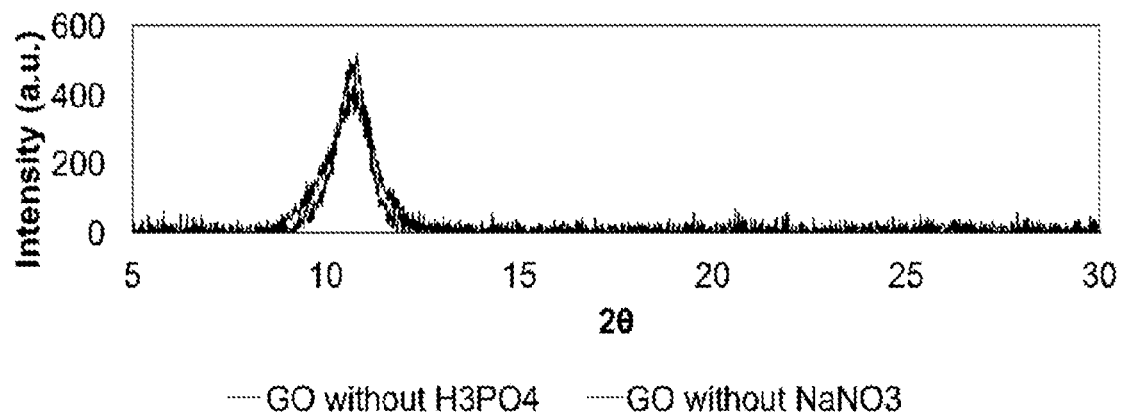
FIG. 5 illustrates XRD traces of various graphene oxide materials preparable from various batch synthesis techniques.

FIG. 5 illustrates traces of various graphene oxide materials preparable from batch synthesis techniques. As is observed, by varying oxidizing agents/intercalating agents utilized in the process, variations in graphene oxide morphologies can be observed. Similarly, as illustrated in the Fourier transform infrared (FTIR) patterns of FIG. 6 and FIG. 7, different graphene oxide materials are obtained using different oxidizing agents/intercalating agents. Moreover, as illustrated by the FTIR patterns in FIG. 16, even using the same oxidizing agents/intercalating agents can produce significant batch-to-batch variations in the graphenic products produced converting graphite to graphenic products. By contrast, in various instances herein, vortex reactors (batch and flow) produce very consistent graphene oxide materials batch-to-batch (including, in the case of flow reactors, on a run-to-run basis or a first out, last out basis). As illustrated in the FTIR patterns of FIG. 17, processes and reactors provided herein are suitable for producing highly consistent materials on a batch-to-batch basis. Moreover, by controlling, where, when and what reagents are added to the reaction, with a high degree of precision, reactors provided herein prove a highly tunable platform for produce graphenic materials. For example, as illustrated in the XRD traces of FIG. 8, FIG. 10, FIG. 13, and FIG. 15, variations in times and flow dynamics (batch, semi-continuous, continuous) of the processes provided herein, a variety of graphenic products are obtainable by processes provided herein.

Figure 22:
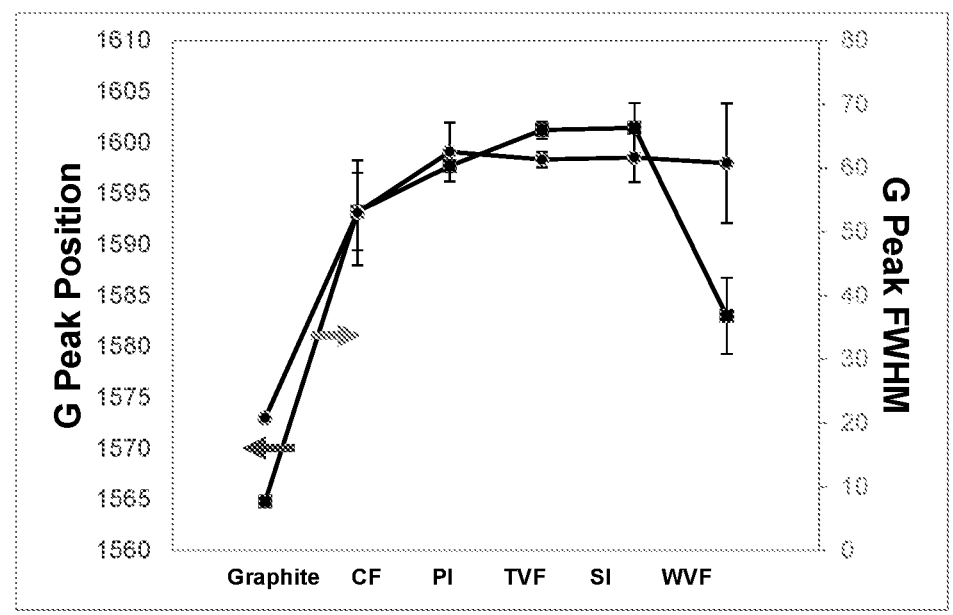
FIG. 22 illustrates 2D Raman spectra G Peak results of various exemplary graphenic structures provided herein.
Figure 23:
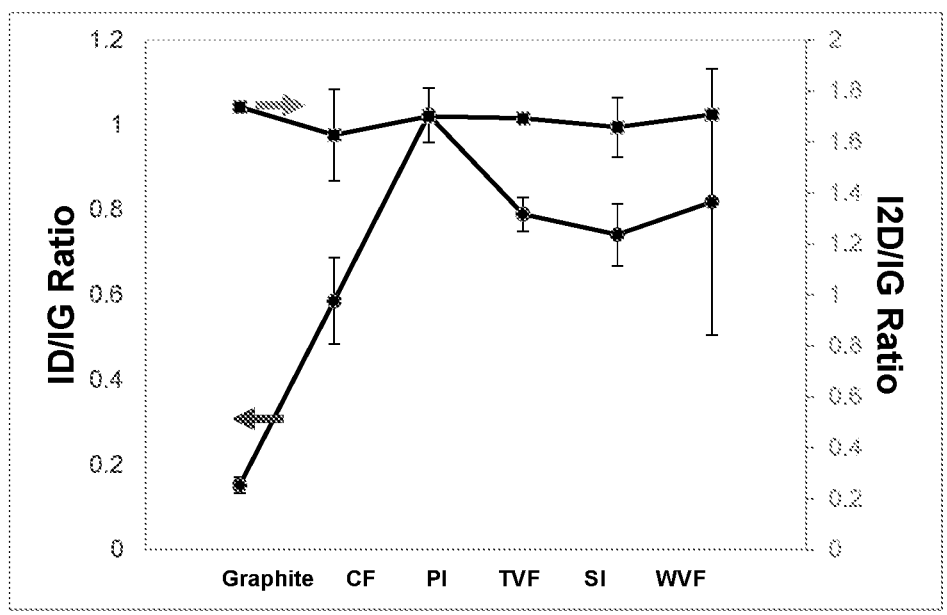
FIG. 23 illustrates 2D Raman spectra G, D, and 2D peak results of various exemplary graphenic structures provided herein.

FIG. 22 further illustrates the uniformity of the graphenic compounds produced according to the processes herein, particularly when using stable or Taylor vortex flows. As illustrated, the TV and SI flows produce graphenic materials with the greatest oxidation levels, whereas the wavy vortex flow produces the least oxidation, despite using the most energy. Moreover, the peak variation of the TV flow is extremely small (small error bars) compared that that of the other flows, including the SI flow, which also had high oxidation. FIG. 23 illustrates ID/IG and I2D/IG ratios, with the TVF demonstrating the smallest error bars, indicating the greatest uniformity of the graphenic compounds produced thereby. In general instances, increasing wavenumber of G band (1570 cm-1) corresponds with increasing oxidation. In typical instances, increasing intensity of D band (1350 cm-1) corresponds with increasing oxidation. In typical instances, the 2D band (2700 cm-1) corresponds with stacking and decreases with oxidation due to increasing exfoliation.

Figure 8:
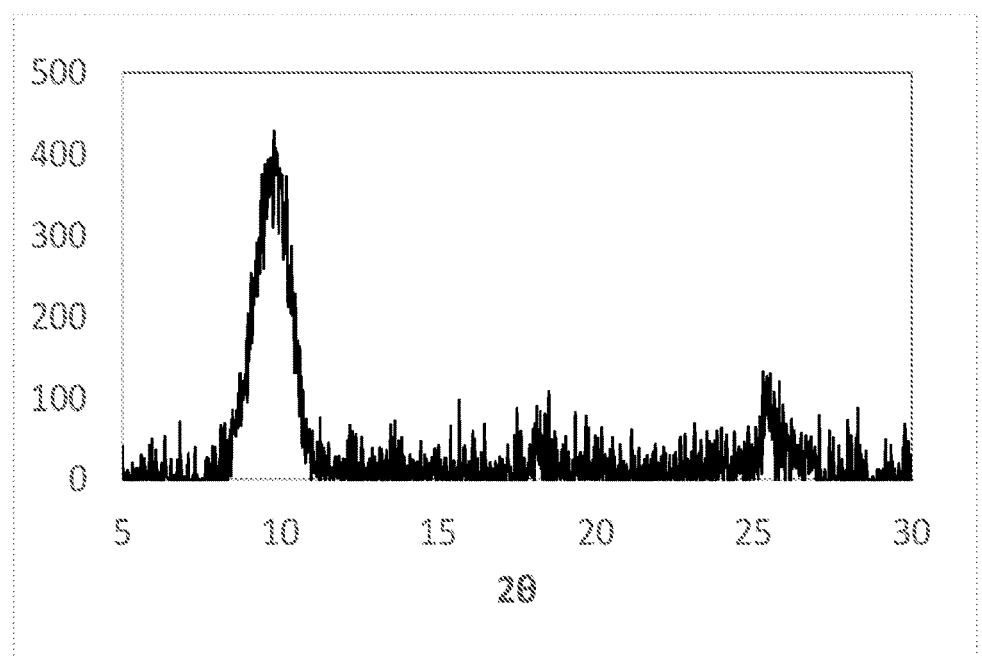
FIG. 8 illustrates a trace of an XRD pattern of an exemplary graphenic material obtained from a toroidal batch reactor (30 minutes).
Figure 9:
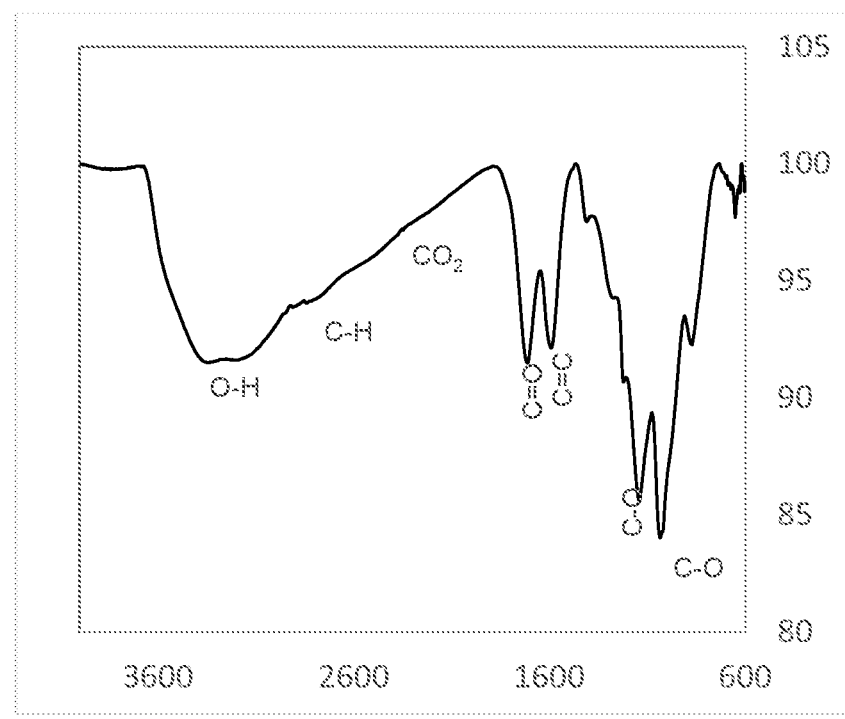
FIG. 9 illustrates a trace of an FTIR pattern of an exemplary graphenic material obtained from a toroidal batch reactor (30 minutes).
Figure 10:
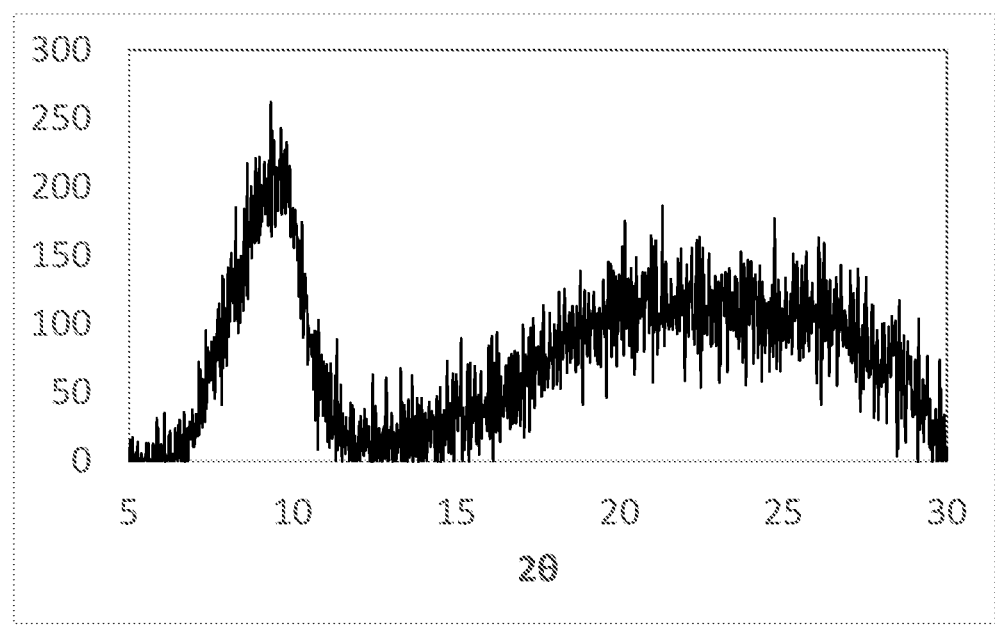
FIG. 10 illustrates a trace of an XRD pattern of an exemplary graphenic material obtained from a toroidal batch reactor (60 minutes).
Figure 11:
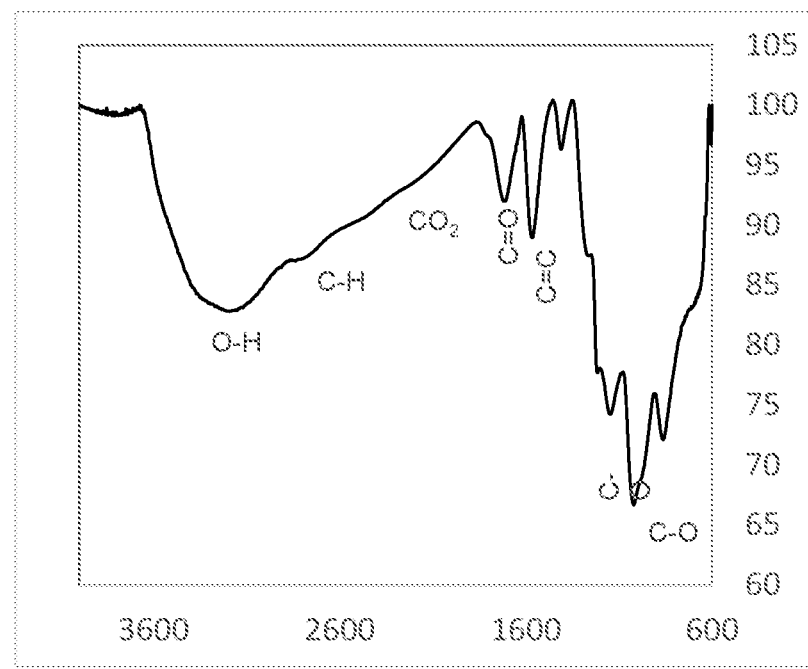
FIG. 11 illustrates a trace of an FTIR pattern of an exemplary graphenic material obtained from a toroidal batch reactor (60 minutes).
Figure 13:
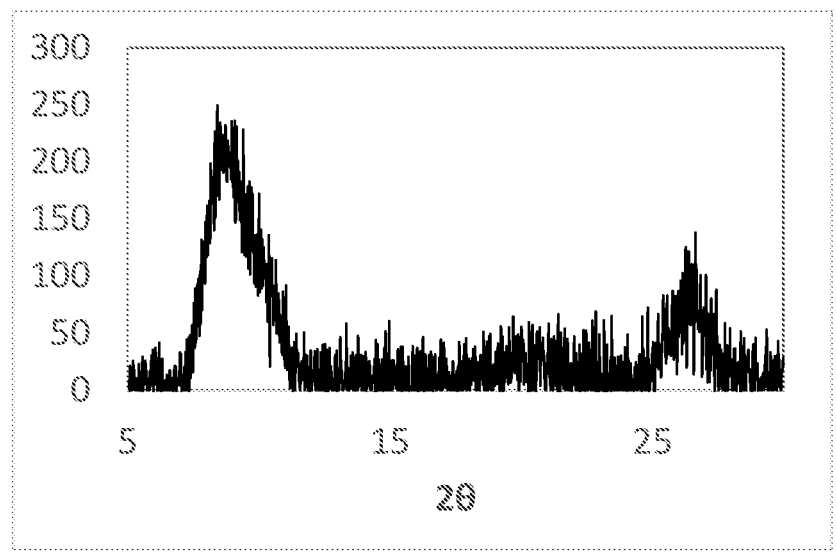
FIG. 13 illustrates a trace of an XRD pattern of an exemplary graphenic material obtained from a semi-continuous toroidal reactor (30 minutes).
Figure 15:
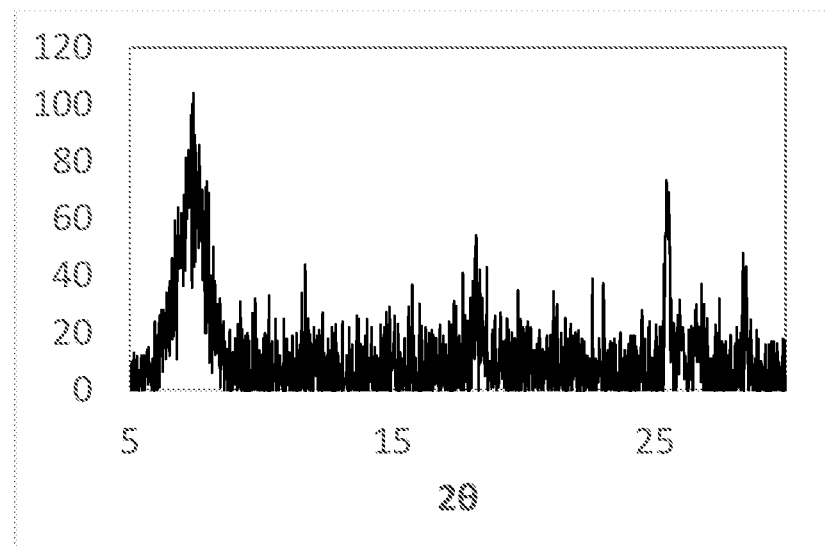
FIG. 15 illustrates a trace of an XRD pattern of an exemplary graphenic material obtained from a continuous toroidal reactor (10 minutes).
Figure 16:
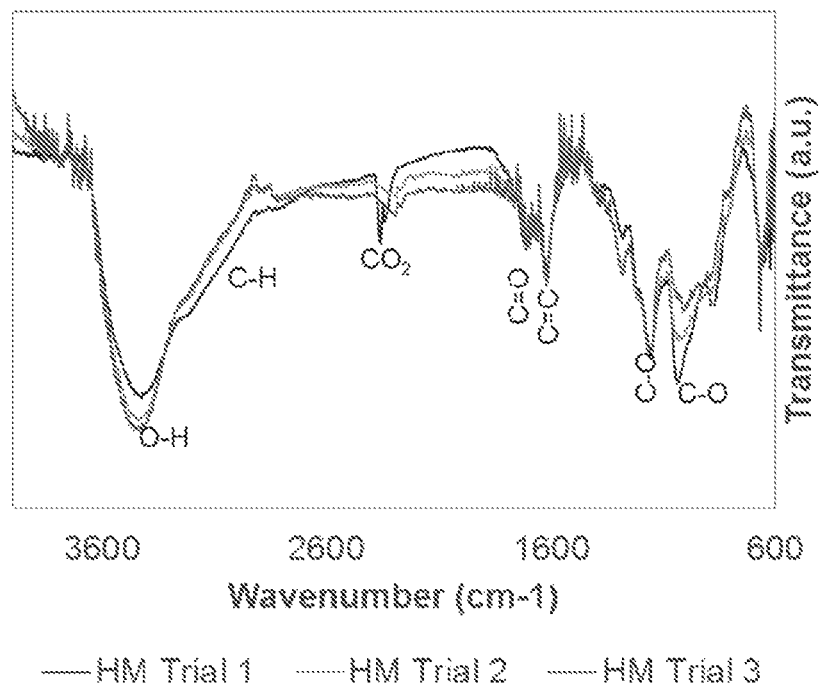
FIG. 16 illustrates traces of FTIR patterns of an exemplary graphene oxide materials obtained from a batch reactor using identical reagents and reaction conditions.
Figure 17:
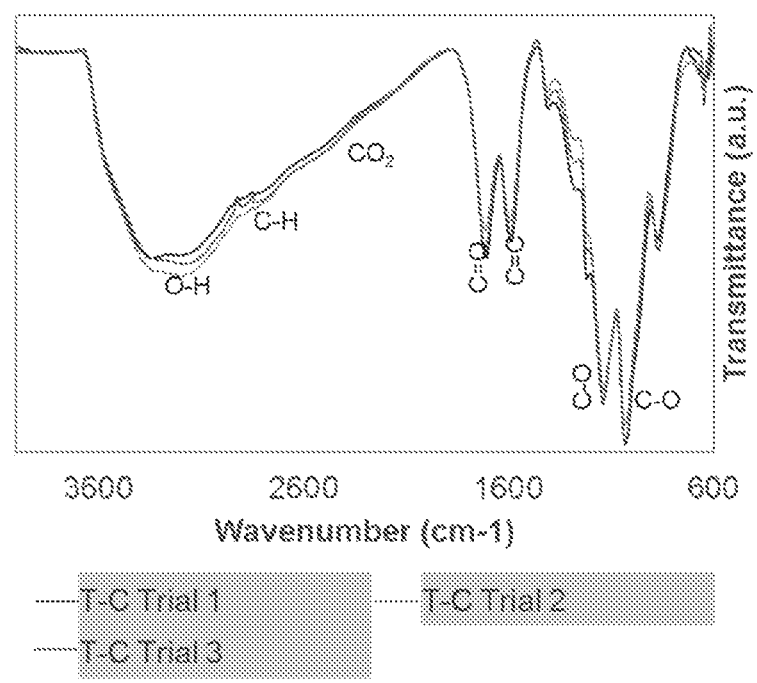
FIG. 17 illustrates traces of FTIR patterns of an exemplary graphene oxide materials obtained from a toroidal reactor using identical reagents and reaction conditions.

FIG. 8 illustrates an XRD pattern of a graphenic (graphene oxide) material comprising graphene oxide having a two-theta (2θ) value of about 9.81°, an interlayer spacing of about 9.0 Å, and about 7 layers, on average. The composition further comprises graphite with a two-theta (2θ) value of about 25.4°, an interlayer spacing of about 3.50 Å, and about 75 layers, on average. FIG. 10 illustrates an XRD pattern of a graphenic (graphene oxide) material having a two-theta (2θ) value of about 9.67°, an interlayer spacing of about 9.1 Å, and about 4 layers, on average. FIG. 13 illustrates an XRD pattern of a graphenic (graphene oxide) material having a two-theta (2θ) value of about 8.49°, an interlayer spacing of about 10.4 Å, and about 4 layers, on average. FIG. 15 illustrates an XRD pattern of a graphenic (graphene oxide) material having a two-theta (2θ) value of about 7.39°, an interlayer spacing of about 12.0 Å, and about 6 layers, on average. Similarly, FTIR traces of exemplary graphenic materials manufactured according to a process and/or with a reactor described are illustrated in FIG. 9, FIG. 11, and FIG. 17. Provided in certain embodiments herein are compositions or graphenic material comprising any one or more such characteristic and/or approximations or variations thereof.

Figure 21:
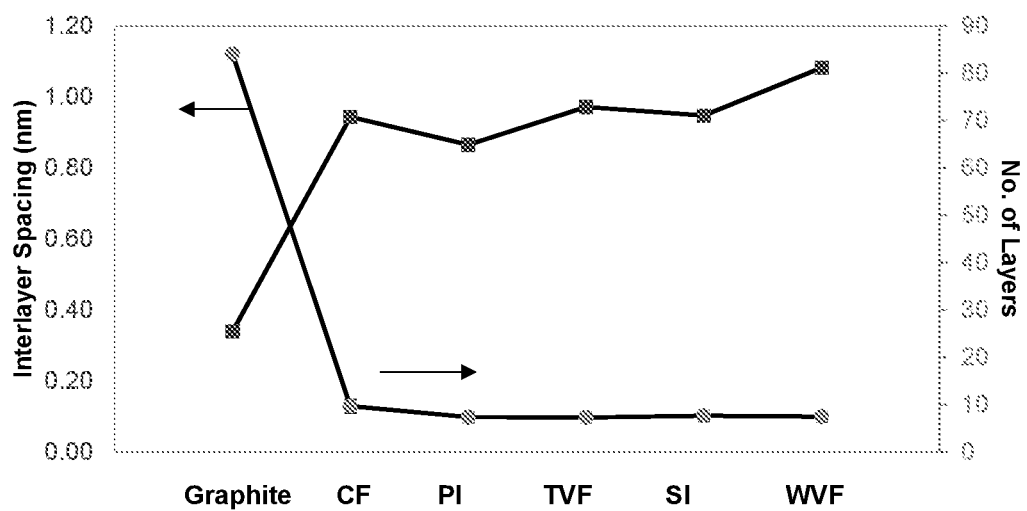
FIG. 21 illustrates interlayer spacing and multi-layered characteristics of exemplary graphenic materials prepared according to exemplary processes provided herein.

FIG. 21 illustrates the different interlayer spacing of the graphenic compounds prepared using the various types of flows described herein. As illustrated, Graphite has very low interlayer spacing, whereas all of the graphenic materials prepared according to a process described herein, using the various flow types described herein, produce graphenic compounds having an interlayer spacing of about 0.8 nm to about 1.1 nm (compared to less than 0.4 nm for graphite). Moreover, the graphenic compounds are observed to have fewer than 10 layers (e.g., 5 to about 10, such as about 8), as compared to about 84 (on average) for the graphite.

In certain embodiments, graphenic compounds described herein and/or produced according to a process herein have 1 to about 15 layers (e.g., on average), such as 1 to about 10 (e.g., on average), such as about 2 to about 10 layers (e.g., on average) or about 5 to about 10 layers (e.g., on average). In some embodiments, (multilayered) graphenic compounds described herein and/or produced according to a process described herein have an average interlayer spacing of about 0.8 nm to about 1.2 nm, such as about 0.8 nm to about 1 nm.

In certain embodiments, provided herein are graphenic compounds having large sizes. In some embodiments, graphenic compounds have a lateral dimension that is comparable to the size of a graphite (e.g., at least 50% the lateral dimension of the graphite, at least 60% the size of the graphite, at least 70% the size of the graphite, at least 80% the size of the graphite, or the like) from which it was produced. In certain embodiments, a graphenic compound provided herein and/or produced according to a process provided herein has a lateral dimension (e.g., longest or average lateral dimension) of at least 20 micron, such as 20 micron to about 200 micron. In some embodiments, the lateral dimension (e.g., longest or average lateral dimension) is at least 25 micron, such as 25 micron to about 200 micron. In certain embodiments, the later dimension (e.g., longest or average lateral dimension) is at least 30 micron, such as 30 micron to about 200 micron. In specific embodiments, the later dimension (e.g., longest or average lateral dimension) is at least 40 micron, such as 40 micron to about 200 micron.

EXAMPLES

Example 1—Batch Graphene Oxide

Graphite is obtained from a variety of sources, including a graphite labelled as 25 micron and a graphite labelled as 150 micron. FIG. 4 illustrates a powder X-ray diffraction (XRD) pattern for the two graphite materials. As illustrated in FIG. 4, 2-theta (2θ) values for the two materials are similar, with a value of about 26.5°. Interlayer spacing is calculated to be about 3.36 Å, with the materials having about 80-85 total layers.

Graphite (1 g, 25 micron) is dispersed in a mixture of 98% sulfuric acid (110 mL) and 85% phosphoric acid (25 mL) at room temperature using a mechanical stirrer. After 10 min of stirring, 4 wt equiv of $KMnO_4$ (4 g) is added. The mixture is stirred for 6-72 hours at 0° C.-40° C. To the resultant mixture, 30% hydrogen peroxide is added and stirred at 40° C.-100° C. The resultant material is centrifuged, washed with 5% hydrochloric acid, and filtered.

Figure 6:
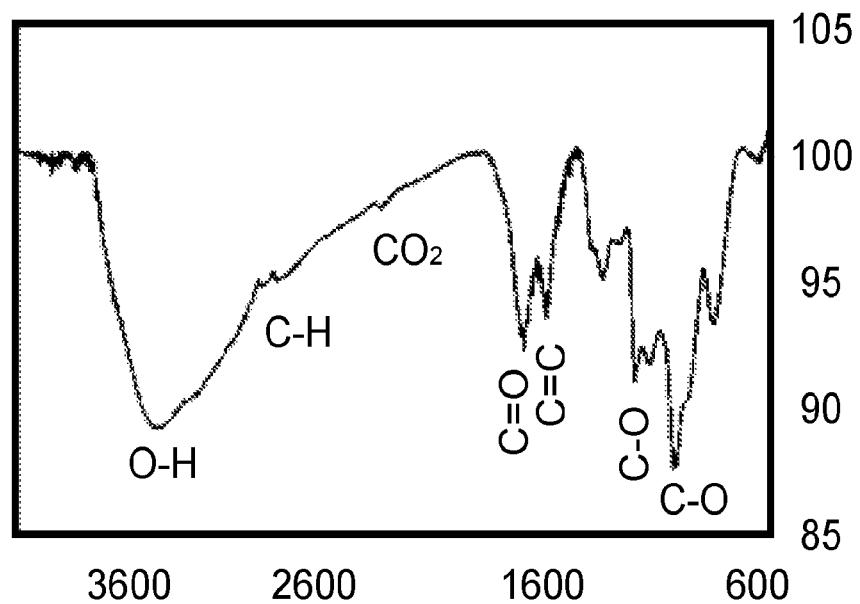
FIG. 6 illustrates a trace of an FTIR pattern of an exemplary graphene oxide materials obtained from a batch reactor using reagents that do not include sodium nitrate.
Figure 7:
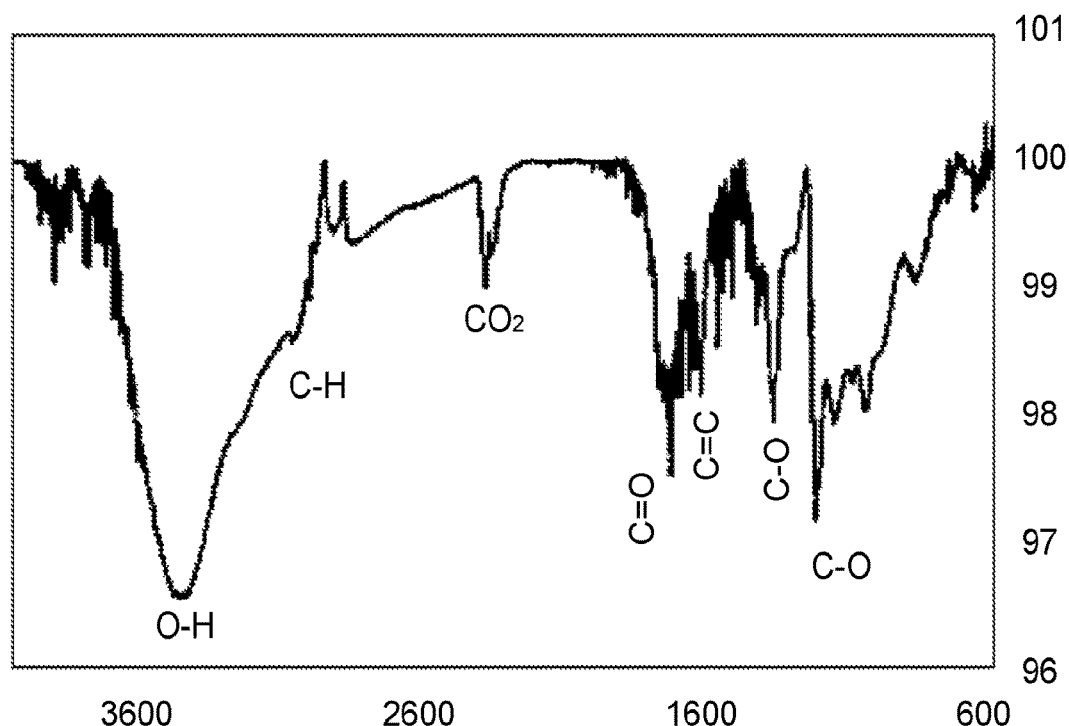
FIG. 7 illustrates a trace of an FTIR pattern of an exemplary graphene oxide materials obtained from a batch reactor using reagents that do not include phosphoric acid.

Using such a process, graphene oxide is prepared, isolated, and evaluated. As illustrated in FIG. 5, the graphene oxide exhibits a powder XRD two-theta (2θ) value of about 10.7°. Interlayer spacing is calculated to be about 8.25 Å, the multi-layered graphene oxide having about 11 layers. Graphene oxide is also prepared using a similar process, except substituting sodium nitrate ($NaNO_3$) for the phosphoric acid. As illustrated in FIG. 5, like the graphene oxide prepared using the phosphoric acid, the graphene oxide prepared using the sodium nitrate exhibits a powder XRD two-theta (2θ) value of about 10.7° and has a calculated interlayer spacing of about 8.23 Å. FTIR analysis of both samples is performed, as illustrated in FIG. 6 and FIG. 7. However, unlike the graphene oxide prepared using phosphoric acid, the graphene oxide prepared using sodium nitrate has significantly larger number of layers, with 18 layers.

As is illustrated by the results herein, modification and control of the oxidation and exfoliation processes of graphite in the manufacture of graphene oxide, can lead to the manufacture of significantly different graphene oxide materials.

Example 2—Batch Graphene Oxide: Toroidal Reactor

Using a process similar to described in Example 1, a batch toroidal reactor (e.g., wherein components are added to the reactor chamber and sealed, without the use of the inlets and outlets described herein), such as illustrated in FIG. 3 is utilized to manufacture graphene oxide from graphite. The internal drum is rotated at a rate of about 600 revolutions per minute (rpm).

After just 30 minutes, the product is quenched with a 30% hydrogen peroxide solution. The resultant graphene oxide product is evaluated as before with two materials being observed, as illustrated by the XRD pattern of FIG. 8. The first material (identified by a first XRD peak) has a powder XRD two-theta (2θ) value of about 9.81° and has a calculated interlayer spacing of about 9.01 Å. The graphene oxide thus provides is determined to comprise about 7 layers, on average. The second material (identified by a second XRD peak) has a powder XRD two-theta (2θ) value of about 25.4° and has a calculated interlayer spacing of about 3.50 Å. This peak appears to correspond with unreacted or insufficiently reacted graphite, having about 75 layers, on average. FTIR analysis is also performed, as illustrated in FIG. 9.

A similar reaction is conducted for 60 minutes, the product is quenched with a 30% hydrogen peroxide solution, with a very viscous solution/suspension being observed. The resultant graphene oxide product is evaluated as before, powder XRD two-theta (2θ) value of about 9.67° (as illustrated in FIG. 10) and has a calculated interlayer spacing of about 9.13 Å. The graphene oxide thus provides is determined to comprise about 4 layers, on average. The graphitic peak at a 2θ of about 25 is not observed. FTIR analysis is also performed, as illustrated in FIG.

Thus, in just 60 minutes complete reaction of the graphite is observed using a toroidal reactor herein, whereas many hours are required to completely transform graphite using more conventional batch techniques, such as described in Example 1. Significantly increased oxidation is observed at significantly shorter time periods for both the 30 minute and 60 minute samples as compared to the batch samples of Example 1. For example, the C—O peaks of the 30 minute (FIG. 9) and 60 minute (FIG. 11) samples prepared using the (batch) toroidal reactor are much larger (relative to the other peaks) than observed for either of the samples of Example 1 (FIG. 6 and FIG. 7). Moreover, significant exfoliation of the graphene oxide is observed (i.e., the resultant graphene oxide is observed to have only about 4 layers, on average, following 60 minutes in the toroidal reaction (and workup)).

Example 3—Graphene Oxide: Semi-Continuous Toroidal Reactor

Using a process similar to described in Example 2, a semi-continuous/semi-batch toroidal reactor (e.g., wherein components are added to the reactor chamber and sealed, with an outlet leading to an inlet to allow a toroidal flow within the reactor), such as illustrated in FIG. 12 is utilized to manufacture graphene oxide from graphite. The internal drum is rotated at a rate of about 600 revolutions per minute (rpm) and the flow is controlled by a pump, which is operated at a rate of 50 rpm.

After cycling for 30 minutes, the product is quenched with a 30% hydrogen peroxide solution. The resultant graphene oxide product is evaluated as before with two materials being observed, as illustrated by the XRD pattern of FIG. 13. The first material (identified by a first XRD peak) has a powder XRD two-theta (2θ) value of about 8.49° and has a calculated interlayer spacing of about 10.40 Å. The graphene oxide thus provided is determined to comprise about 4 layers, on average. The second material (identified by a second XRD peak) has a powder XRD two-theta (2θ) value of about 26.3° and has a calculated interlayer spacing of about 3.38 Å. This peak corresponds with graphene oxide having about 17 layers, on average.

Relative to the graphene oxide prepared by the batch process of Example 2, the graphene oxide materials in this semi-continuous example are much more highly processed after identical periods of time (30 minutes). In the batch process, the larger (graphene oxide) peak after 30 minutes has an interlayer spacing layer of 9.01 Å, versus the interlayer spacing of about 10.40 Å observed for the semi-continuous process. Moreover, the batch vortex reactor process primarily produces graphene oxide having about 7 layers after 30 minutes, whereas the semi-continuous process primarily produces graphene oxide having about 4 layers after 30 minutes.

In addition, while the batch vortex reactor process of Example 2 produces a mix of graphene oxide and graphite after 30 minutes, the semi-continuous process of Example 3 produces only graphene oxide. Where the secondary product of Example 2 after 30 minutes is graphite, the secondary product of Example 3 after 30 minutes is multi-layered graphene oxide. However, rather than the 4 layered graphene oxide of the primary product of the semi-continuous process of Example 3 and the graphite of the secondary product of the batch process of Example 2, the secondary product of Example 3 has 17 layers, on average.

Therefore, use of the semi-continuous process of Example 3 produces graphene oxide with increased exfoliation and increased interlayer spacing relative to the batch process of Example 2. Moreover, both processes produce graphene oxide at a much faster rate than the general batch process of Example 1, which takes several hours to convert graphite to graphene oxide in a suitable amount.

Example 4—Graphene Oxide: Continuous Toroidal Reactor

Using a process similar to described in Example 3, a continuous toroidal reactor (e.g., wherein components are added to the reactor chamber and sealed, with inlets providing raw materials and a graphene oxide product), such as illustrated in FIG. 14 is utilized to manufacture graphene oxide from graphite. The internal drum is rotated at a rate of about 600 revolutions per minute (rpm) and the flow is controlled by a pump, which is operated at a rate of 50 rpm.

The graphite raw material is injected into the reactor and passed through the reactor in 10 minutes, whereupon the product is quenched with a 30% hydrogen peroxide solution. The resultant graphene oxide product is evaluated as before with one materials being observed, as illustrated by the XRD pattern of FIG. 15. The product (identified by a first XRD peak) has a powder XRD two-theta (2θ) value of about 7.39° and has a calculated interlayer spacing of about 11.95 Å. The graphene oxide thus provided is determined to comprise about 6 layers, on average.

Relative to the graphene oxide prepared by the batch process of Example 2 after 30 minutes, the graphene oxide materials in this continuous example are much more highly processed after just ⅓ of the time (10 minutes). In the batch process, a mixture of graphene oxide and a graphite is produced after 30 minutes, whereas the continuous process produces just graphene oxide after just 10 minutes. Moreover, the graphene oxide process of the batch process of Example 2 produces graphene oxide having an interlayer spacing layer of 9.01 Å after 30 minutes, versus the interlayer spacing of about 11.95 Å observed for the continuous process after just 10 minutes. Moreover, the batch vortex reactor process primarily produces graphene oxide having about 7 layers after 30 minutes, whereas the continuous process primarily produces graphene oxide having about 6 layers after 10 minutes.

In addition, while the batch vortex reactor process of Example 2 produces a mix of graphene oxide and graphite after 30 minutes, the continuous process of Example 4 produces only graphene oxide, even after a much shorter time period (10 minutes). Where the secondary product of Example 2 after 30 minutes is graphite.

Relative to the mixed graphene oxide prepared by the semi-continuous process of Example 3 after 30 minutes, the graphene oxide materials in this continuous example are much more highly processed after just ⅓ of the time (10 minutes). In the semi-continuous process, a (e.g., bimodal) mixture of graphene oxides is produced after 30 minutes, whereas the continuous process produces a largely uniform graphene oxide after just 10 minutes. Moreover, the graphene oxide process of the semi-continuous process of Example 3 produces graphene oxide having an interlayer spacing layer of 10.40 Å after 30 minutes, versus the interlayer spacing of about 11.95 Å observed for the continuous process after just 10 minutes, however, the semi-continuous vortex reactor process primarily produces graphene oxide having about 4 layers (with a secondary product having about 17 layers) after 30 minutes, whereas the continuous process primarily produces graphene oxide having about 6 layers after 10 minutes.

Therefore, use of the continuous process of Example 4 produces graphene oxide with increased exfoliation and increased interlayer spacing relative to the batch process of Example 2. Moreover, both processes produce graphene oxide at a much faster rate than the general batch process of Example 1, which takes several hours to convert graphite to graphene oxide in a suitable amount.

Example 5—Graphene Oxide: Continuous Toroidal Reactor (1 Minute)

Using a process similar to described in Example 4, a continuous toroidal reactor (e.g., wherein components are added to the reactor chamber and sealed, with inlets providing raw materials and a graphene oxide product), such as illustrated in FIG. 14 is utilized to manufacture graphene oxide from graphite. The graphite raw material is injected into the reactor and passed through the reactor in just 1 minute, whereupon the product is quenched with a 30% hydrogen peroxide solution. Similar to that observed in Example 4, the resultant graphene oxide product has a calculated interlayer spacing of about 12 Å and 6 layers, on average. Moreover, very large graphenic structures are obtained, generally over 20 micron (such as about 50 micron).

Various products prepared according to processes similar to those in Examples 1-5 are illustrated in Table 1.

TABLE 1

| Reaction scheme | Reaction Time | Average No. of GO layers and layer spacing |
| --- | --- | --- |
| Batch reactor (stirred tank) | 8 hrs | 5-11 layers, 11 Å |
| T-C reactor (batch) | 30 min. | 9 layers, 9 Å |
| Semi-batch T-C reactor | 30 min. | 4 layers, 10 Å |
| Continuous T-C reactor | 1 min. | 6 layers, 12 Å |

Example 6—Batch Graphene: Semi-Continuous Toroidal Reactor

Using a process similar to described in Example 3, a semi-continuous/semi-batch toroidal reactor (e.g., wherein components are added to the reactor chamber and sealed, with an outlet leading to an inlet to allow a toroidal flow within the reactor), with the oxidizing agents omitted, is utilized to manufacture graphene from graphite.

Example 7—Batch Graphene: Continuous Toroidal Reactor

Using a process similar to described in Example 4, a continuous/semi-batch toroidal reactor (e.g., wherein components are added to the reactor chamber and sealed, with an outlet leading to an inlet to allow a toroidal flow within the reactor), with the oxidizing agents omitted, is utilized to manufacture graphene from graphite.

Example 8—Graphene Oxide Variation

A single graphite sample from a single source is divided into three portions and subjected to identical batch processing conditions described in Example 1. FTIR analysis of the resultant products are evaluated and illustrated in FIG. 16. As illustrated, significant variations in oxidation are observed, batch-to-batch.

Similarly, a single graphite sample from a single source is divided into three portions and subjected to an identical process using a vortex reactor, such as described in Example 3. FTIR analysis of the resultant products are evaluated and illustrated in FIG. 17. As illustrated, very little variations in oxidation is observed, batch-to-batch, with very good overlap of FTIR traces being observed between samples.

Example 9—Flow Variation

Graphitic stock is provided to a reactor as described in the examples above is utilized. The flow type used in the reactor is varied by varying the rotational rates of the reactor walls. FIG. 19 illustrates the Couette (laminar) flow observed at slow rotational speeds (e.g., wherein $Ta<Ta_c$). Further, as illustrated in FIG. 19, when Ta exceeds Tac, vortexes form, but when Ta is close to Tac, instabilities (vortexes) form near the reactor inlet, but as the flow continues toward the reactor exit, laminar flow resumes. This type of flow is illustrated as primary instabilities (PI). As Ta increases, instabilities form throughout the reactor, forming a Taylor vortex flow (TVF). Increasing the $Ta/Ta_c$ further, however, creates a secondary instability (SI), where a wavy flow is observed near the inlet of the reactor. Further increase of $Ta/Ta_c$ leads to a full wavy vortex flow (WVF).

FIG. 20 illustrates the results of injecting graphite into a reactor herein, with the various flow types illustrated in FIG. 19. As illustrated in FIG. 20, after just one minute, in a reactor having a (stable) laminar or Couette (shearing) flow is observed to have excellent conversion of graphite to graphenic compound (graphene oxide). By contrast the primary instability flow is observed to have good conversion to the graphenic compound, but some graphite remains. The stable vortex flow (Taylor vortex flow) is observed to provide excellent conversion of graphite to the graphenic compound, with no graphite component observed. By contrast, both flows having wavy morphologies and that use the most amount of energy produced good conversion of graphite to graphenic compound (graphene oxide), but had significant amounts of graphite also observed.

FIG. 21 illustrates the different interlayer spacing of the graphenic compounds prepared using the various types of flows described herein. As illustrated, Graphite has very low interlayer spacing, whereas all of the graphenic materials prepared according to a process described herein, using the various flow types described herein, produce graphenic compounds having an interlayer spacing of about 0.8 nm to about 1.1 nm (compared to less than 0.4 nm for graphite). Moreover, the graphenic compounds are observed to have fewer than 10 layers (e.g., 5 to about 10, such as about 8), as compared to about 84 (on average) for the graphite.

FIG. 22 illustrates the uniformity of the graphenic compounds produced according to the processes herein, particularly when using stable or Taylor vortex flows. As illustrated, the TV and SI flows produce graphenic materials with the greatest oxidation levels, whereas the wavy vortex flow produces the least oxidation, despite using the most energy. Moreover, the peak variation of the TV flow is extremely small (small error bars) compared that that of the other flows, including the SI flow, which also had high oxidation. FIG. 23 illustrates ID/IG and I2D/IG ratios, with the TVF demonstrating the smallest error bars, indicating the greatest uniformity of the graphenic compounds produced thereby.

What is claimed is:

1. A process for manufacturing a graphenic compound, the process comprising:
   a. injecting a first stock into a first inlet of a continuous or semi-continuous reactor, the first stock comprising graphite;
   b. optionally injecting a second stock into a second inlet of the continuous reactor or semi-continuous reactor, the second stock comprising potassium permanganate;
   c. optionally injecting a third stock into a third inlet of the continuous or semi-continuous reactor, the third stock comprising an oxidizing or quenching agent and being injected downstream from the injection point of the first and/or second stock(s);
   d. optionally injecting a fourth stock into a fourth inlet of the continuous reactor or semi-continuous reactor, the fourth stock comprising water and being injected downstream from the injection point of the first, second, and third stocks; and
   e. collecting the graphenic compound from an outlet of the continuous reactor or semi-continuous reactor, the graphenic compound being collected downstream from the injection points of the first, second, third, and fourth stocks, wherein the continuous reactor or semi-continuous reactor comprises a reactor chamber into which the first, second, third, and fourth stocks are injected; the reactor chamber being configured between an outer wall of a first cylindrical body and the inner wall of a second cylindrical body or bore, one or both of the first and/or second cylindrical bodies rotating around the axis thereof; and the first and second cylindrical bodies are rotating in opposite directions.

2. The process of claim 1, wherein the continuous reactor has a flow from the first inlet to the outlet, the flow being a vortex flow.

3. The process of claim 2, wherein the vortex flow is a toroidal vortex flow.

4. The process of claim 1, wherein the continuous reactor is configured to produce a toroidal vortex flow.

5. The process of claim 4, wherein the toroidal vortex flow comprises a plurality of non-axisymmetric toroidal vortices.

6. The process of claim 1, wherein the continuous reactor is a continuous Taylor-Couette reactor.

7. The process of claim 1, wherein the first fluid stock further comprising phosphoric acid and wherein the quenching agent is hydrogen peroxide.

8. The process of claim 1, wherein the graphite is intercalated with sulfuric acid, bisulfate, sulfate, or a combination thereof upstream of injection of the third stock.

9. The process of claim 1, wherein the graphite is converted to graphite oxide upstream of injection of the fourth stock.

10. The process of claim 9, wherein the graphene oxide is in the form of a particle comprising more than one graphene oxide sheet, on average, or a particle comprising about 2 to about 20 graphene oxide sheets, on average.

11. The process of claim 1, wherein the first stock comprises graphite in a concentration of about 0.1 wt. % to about 50 wt. %.

12. The method of claim 1, wherein the graphenic compound is graphene oxide.

* * * * *